United States Patent Office 3,303,472
Patented Feb. 7, 1967

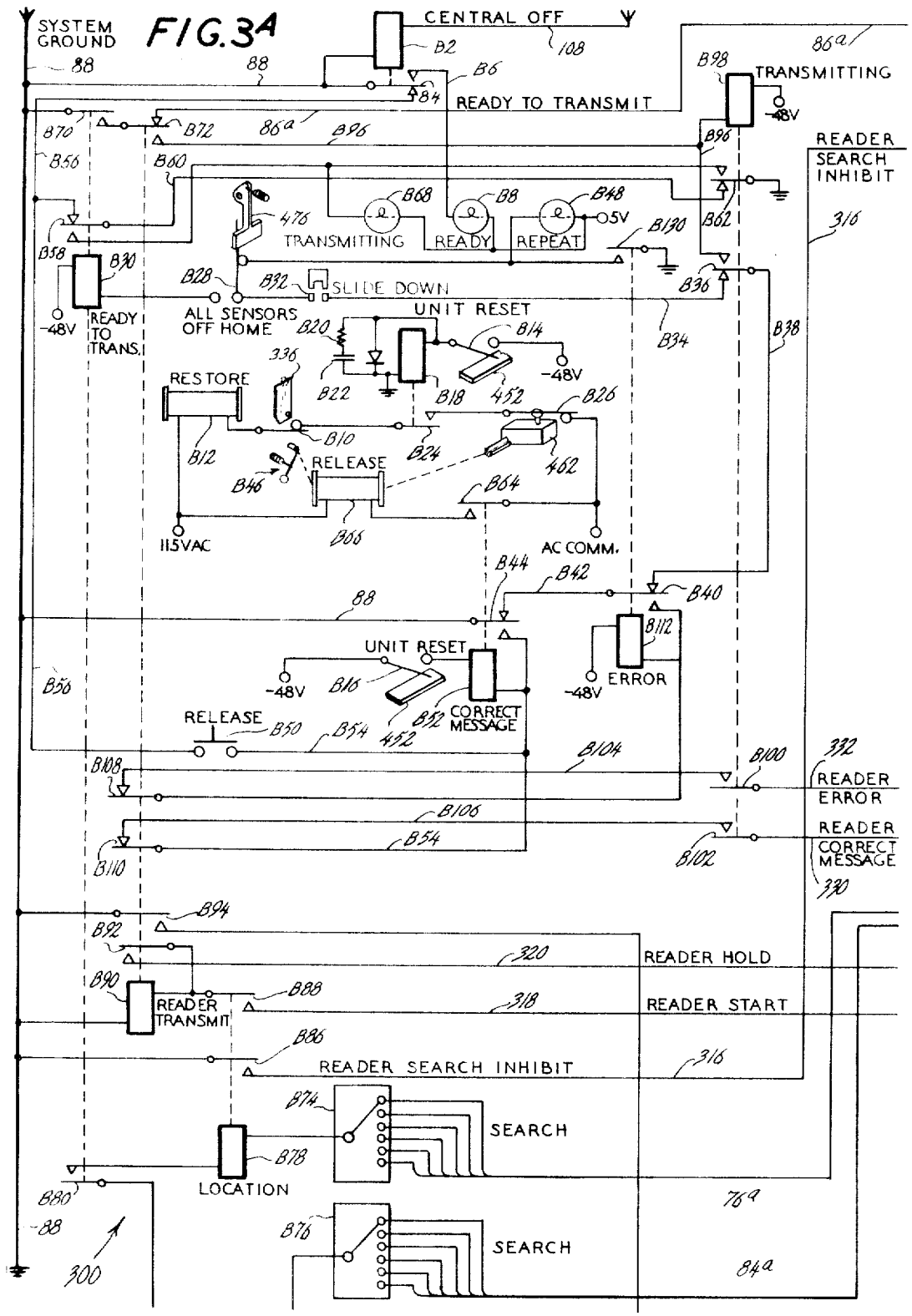

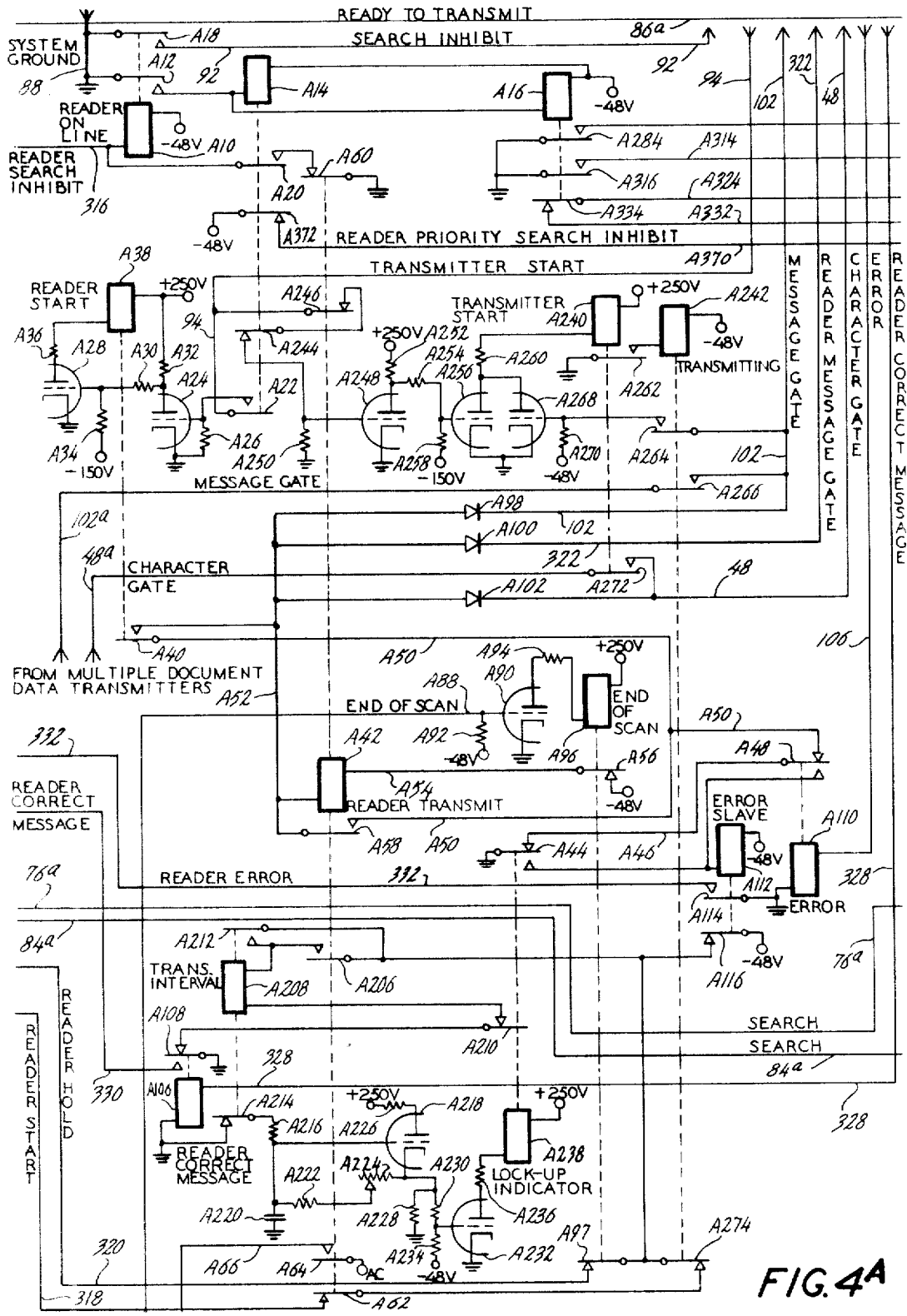

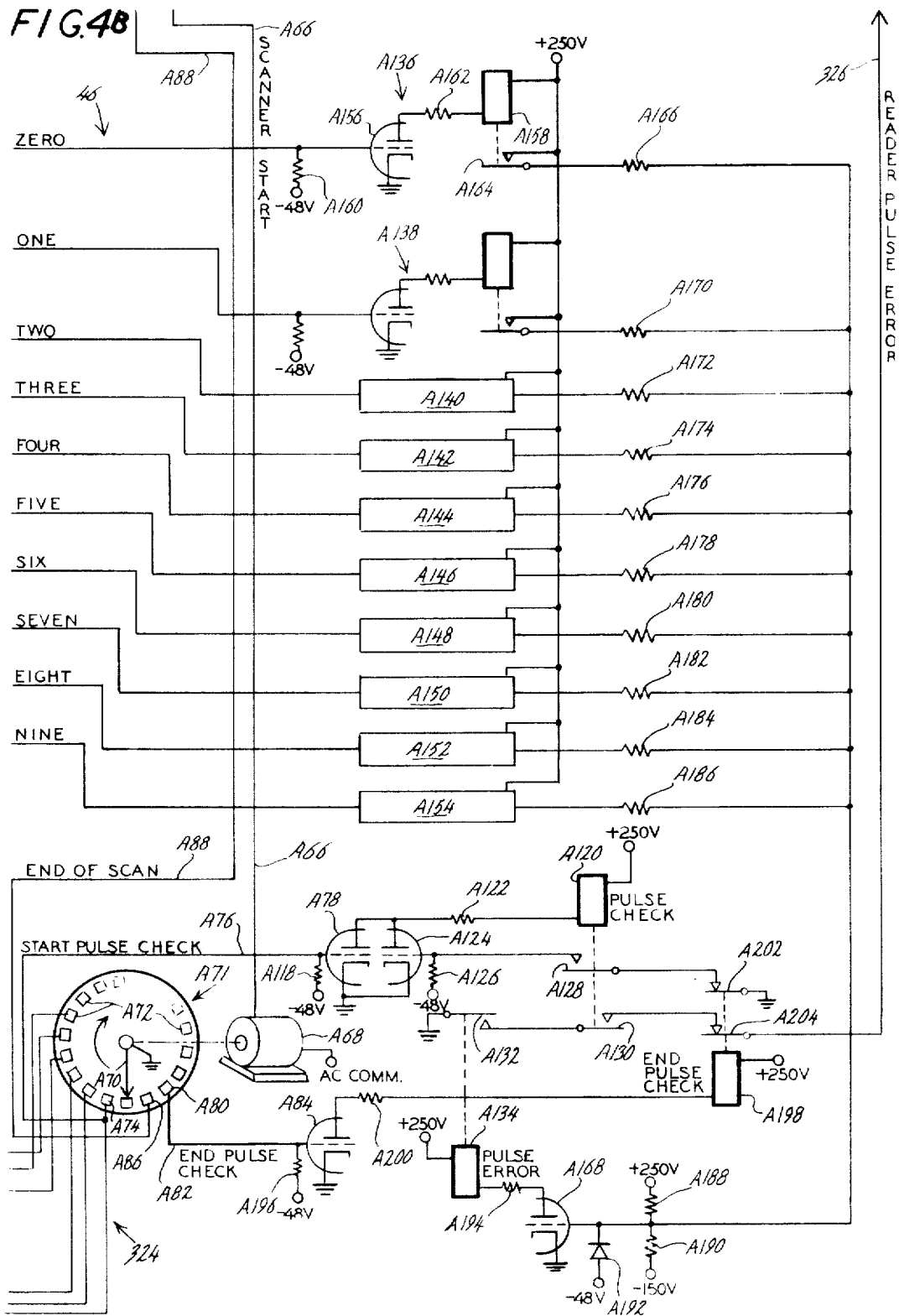

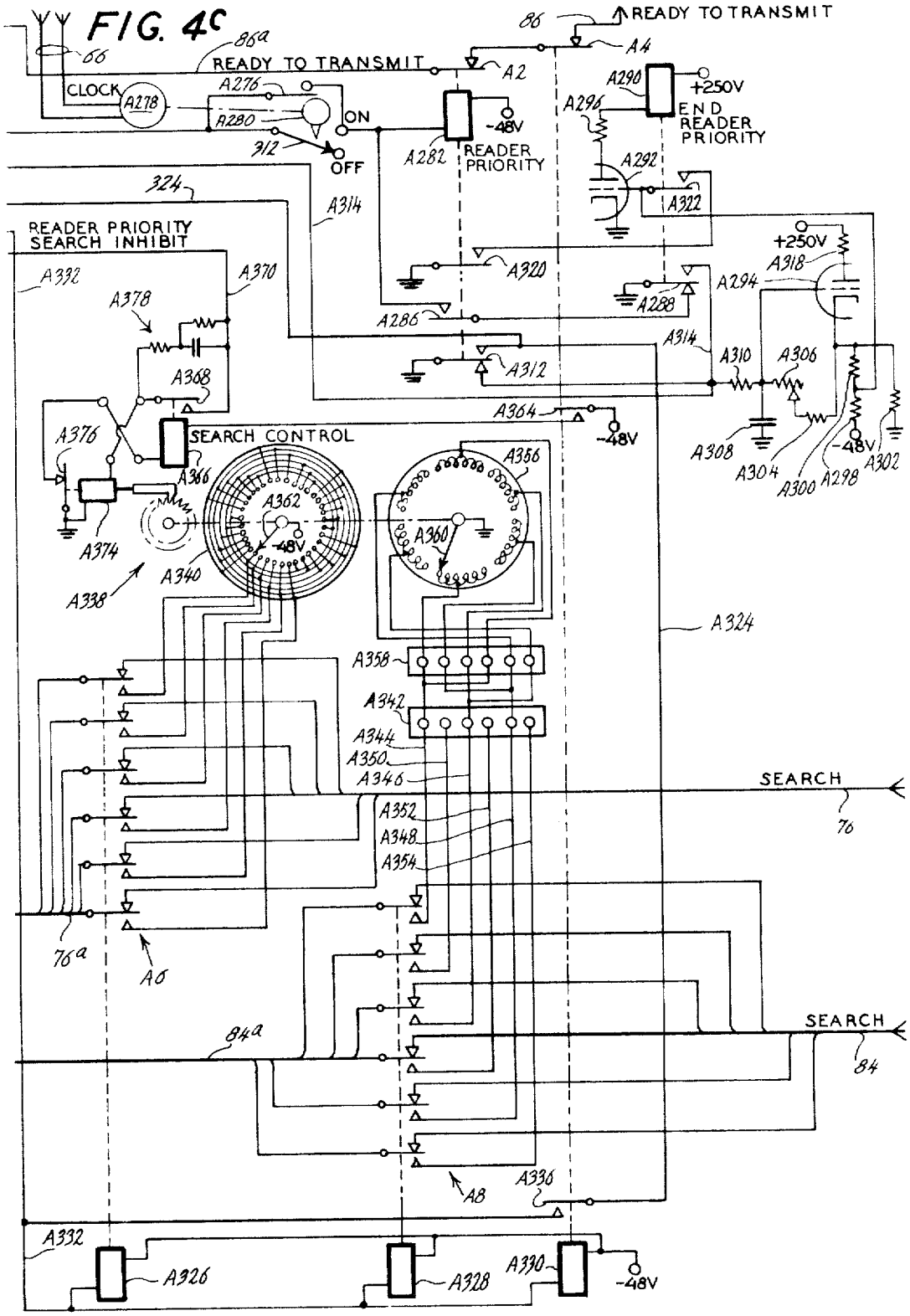

---

3,303,472
SYSTEM AND APPARATUS FOR AUTOMATIC DATA COLLECTION
Oliver H. Chalker, Jr., and George J. Yagusic, Litchfield, and Raymond R. Lupkas, Waterbury, Conn., assignors, by mesne assignments, to Control Data Corporation, Minneapolis, Minn., a corporation of Minnesota
Filed Oct. 8, 1962, Ser. No. 229,001
14 Claims. (Cl. 340—172.5)

This application is a continuation-in-part of the following applications Serial Number 863,227; Serial Number 196,672; Serial Number 163,153 now Patent No. 3,249,917; Serial Number 205,659 now Patent No. 3,268,870; Serial Number 841,926 now Patent No. 3,109,089.

This invention relates to a system and apparatus for automatic data collection. More particularly, it relates to a system and apparatus for incorporating a special transmitting station into the automatic data collection system disclosed in United States patent application Serial No. 863,227, filed December 31, 1959, by Andrew C. Reynolds, Jr., John F. Carragan and George J. Yagusic entitled "System and Apparatus for Automatic Data Collection," which application is incorporated herein by reference. The special transmitter is of the type disclosed in United States patent application Serial No. 196,672, filed May 22, 1962, by Andrew Craig Reynolds, Jr., Oliver H. Chalker, Jr., and Raymond R. Lupkas entitled, "Automatic Card Reading System," which application is incorporated herein by reference.

It is contemplated that data collection systems according to the present invention, and the two above-identified applications, may incorporate the inventions disclosed in United States patent application Serial No. 163,153, now Patent No. 3,249,917, filed December 29, 1961, by George J. Yagusic entitled "System and Apparatus for Automatic Data Collection"; and in United States patent application Serial No. 205,659, now Patent No. 3,268,870, filed June 27, 1962 by Oliver H. Chalker, Jr., George J. Yagusic and William E. O'Conner entitled, "System and Apparatus for Automatic Data Collection"; which applications are incorporated herein by reference. Further, the system may incorporate other data transmitters of the type disclosed in United States patent application Serial No. 841,926, now Patent No. 3,109,089, filed September 21, 1959, by Andrew C. Reynolds, Jr., Oliver H. Chalker, John F. Carragan and Edward J. Gutowski entitled "Data Transmission Apparatus," which application is incorporated herein by reference.

The present application is assigned to the same assignee as all of the above-identified earlier applications.

The automatic data collection system of the above-identified copending applications; Serial Numbers 841,926; now Patent No. 3,109,089; 863,227; 163,153; now Patent No. 3,249,917; 205,659; now Patent No. 3,268,870; and 841,926, now Patent No. 3,109,089, may be used, for example, in factories where a plurality of data transmitters may be installed in different areas, shops, or departments, for transmission of manufacturing data to a central receiver-recorder which may be located in a central accounting office. Such data may include, for example: the number of units manufactured on particular machines; the designated job orders filled by machine operators; the identity and hourly wage rates of the machine operators; the total time required for each operation, etc. Alternatively, the apparatus of the invention may be used in warehouses and distribution centers for collection of order receipt and delivery time information for inventory control purposes, or in department stores for automatic collection of point of origin sales data, etc.

In a large factory, for example, there is, at present, a great deal of paper work required to be done in the various shops and departments, including the preparation of such hand-written reports as time tickets for payroll entries, production and inventory control records, cost accounting records, quality control inspection and scheduling reports, etc. For automatic central office computing, this mass of data now has to be individually punched into cards by manual operations, and the punched cards have to be verified by human operators before they can be fed to tabulating or computer apparatus. Various systems which have heretofore been suggested for expediting the flow of this information into a central office have included the use of closed-circuit television, which introduces the added problem of human error in reading the data from a TV screen, and the use of intercommunicating telephone circuits, which frequently results in error from misunderstanding of the verbally relayed information. In these prior art systems, the multiplicity of personnel involved results in divided responsibility, which is quite undesirable.

The principle of the data transmission and collection system of the above-identified copending applications is to capture the required information at the point of origin, select, sort, and collate it automatically and substantially instantaneously, and then to transmit infallibly the desired data to a central receiver-recorder where it is permanently punched into tape or recorded on some other common language meduim which can be fed directly into an automatic computer or conventional tabulating equipment without further intervention or possibility of human error.

The system and apparatus disclosed in the above-identified copending applications is related to the system and apparatus disclosed in United States Patent No. 2,918,654 of Curtis Hillyer entitled, "Automatic Information Transmission," which patent issued December 22, 1959, to the assignee of the present application.

*Problems of the prior art*

A data collection problem which has existed for many years in offices and factories employing more than a few workers is that of attendance recording. The problem has in the past been solved through the use of so-called time clock systems wherein individual cards for each worker are disposed in racks adjacent to a time clock. In such systems an arriving worker must select his own card and insert it in the time clock where the time is recorded on the card usually by stamping. The card is then returned to an appropriate rack.

There are many objections to such a system. There is no guarantee that the workman will not inadvertently or deliberately select the wrong card. Since the workman must select his card from a large array presented by the storage racks, selecting the proper card takes a considerable amount of time and results in congestion around the time clock. Even after the correct card is selected, stamped and returned to its proper place in the proper rack, the stamped cards must be collected and the data recorded thereon must be transcribed into another form, perhaps several times, before it is available for use. The data is used, not only for calculating payrolls, but also for determining the work force available having particular skills, in order to prepare daily job assignments. Delay in the availability of this information results in workmen needlessly standing idle. The required repetitive handling of the data, in itself, greatly increases the possibility of error, and is expensive and time consuming.

The automatic card reader disclosed in the above-identified application Serial Number 196,672 is an apparatus for reading information recorded on documents, and in particular reading information from relatively rigid cards, the information having been prerecorded in the form of punched holes laterally spaced in a plurality of columns. The document reader disclosed in Serial Number 196,672 may be used as an attendance recorder for reading a workman's identification badge in the form of a rigid card containing a plurality of punched holes to identify the workman in addition to the usual printed photograph, name and number. When so used a workman upon entering a plant inserts his identification badge into a card reader. The reader automatically reads the punched data on the badge, identifying the workman and his skills and transmits it to a suitable central recorder. The time of this transmission is also recorded at the central recorder. Thus, the document reader can replace conventional time clock systems.

Reference should be had to the above-identified applications and patent for details of the operation of the data collection system and document reader not important to the invention herein disclosed.

The data collection system disclosed in the above-identified application Serial Number 863,227 when incorporating the transmitters disclosed in the above-identified application Serial No. 841,926, now Patent No. 3,109,089, has met with wide commercial success and is now used in a wide variety of manufacturing and inventory operations. The system has often been used for attendance recording. When so used, a workman's identification card is inserted into a transmitter of the system, each of which is capable of simultaneously accepting a plurality of punched cards. One of the variable dials of the transmitter is set to transmit a character indicating that attendance data is being transmitted. The other variable dials of the transmitter are not used. This system has been found to be somewhat inefficient for several reasons. Probably the most important is that valuable system time is lost by using the type of transmitters disclosed in application Serial Number 841,926, now Patent No. 3,109,089 for simple attendance recording. That is, time may be wasted in scanning empty data card receivers and in scanning variable dials which carry no information. Also, it is quite possible for a worker to inadvertently set a variable dial to the wrong setting for the attendance recording operation.

It has also been found that in many manufacturing and inventory operations data from only one punched card is required to be transmitted at a time, and in addition to this, only one variable character need be transmitted. These applications are similar to those which have hithertofore been met through the use of time stamps and job recorders wherein the only data required is, for example, the stock number of a part and the time at which it was received in inventory, or a part number and the time that a manufacturing operation began on the part, and subsequently the time that the manufacturing operation was completed.

The multiple document data transmitters disclosed in the above-identified application Serial Number 841,926, now Patent No. 3,109,089 may be used in these "single document" time stamp and job recorder applications. However, they are subject to the same disadvantages as mentioned above when used for attendance recording.

An additional disadvantage in the use of these transmitters for attendance recording or as time stamps or job recorders is that, being designed for reading a plurality of data cards simultaneously, they incorporate rather complex and expensive scanning apparatus for this purpose. In many applications where only one card need be read at a time, less expensive and complex apparatus will suffice.

Another difficulty in utilizing the transmitters disclosed in application Serial Number 841,926, now Patent No. 3,109,089 in the system disclosed in application Serial Number 863,227 for attendance recording is that fire regulations, union rules, etc., require that workers be able to clock in and clock out in a matter of a few minutes even in plants employing thousands of workers. It has therefore been found to be undesirable to have transmitters of the type disclosed in application Serial Number 841,926 connected to the same receiver-recorder simultaneously used for both attendance recording and other data recording applications. Furthermore, due to system time limitations it has not been feasible to connect as many transmitters used as attendance recorders to a receiver-recorder as can be connected thereto when the transmitters are used for ordinary data recording. Thus, plants using automatic attendance recording require a large number of receiver-recorders, greatly increasing the expense of the system and making it prohibitively costly for many concerns.

Objects

Accordingly, it is an object of the invention to provide a data collection system for automatic attendance recording.

Another object of the invention is to provide a data collection system for simple job cost recording.

Still another object of the invention is to provide a data collection system for simple time recording.

A further object of the invention is to provide a data collection system adapted to accomplish the above objects simultaneously.

Another object of the invention is to provide capabilities of the above character in an existing data collection system designed for more complex multidocument data recording.

Still a further object of the invention is to incorporate a single document reader station into an existing data collection system of the above character.

Still another object of the invention is to simplify and to reduce the amount of complex equipment required at a single document reader station.

A still further object of the invention is to provide a data collection system incorporating both single and multiple document reader-transmitter stations.

Another object of the invention is to provide a data collection system of the above character in which preselected reader-transmitter stations are given priority over other reader-transmitter stations of the system, at predetermined times.

A further object of the invention is to provide a data collection system of the above character wherein the amount of time required for transmission from different reader-transmitter stations is proportional to the amount of data transmitted from said stations.

Still another object of the invention is to provide means for detecting and correcting erroneous transmissions from a single document reader of the above character.

Still a further object of the invention is to provide a form of document to be read by reader-transmitters of the above character.

Yet another object of the invention is to provide an adaptor for connection to a receiver-recorder of an existing data collection system to provide the above capabilities.

Yet a further object of the invention is to provide an adaptor of the above character to which single document reader stations are connected for transmission of data to an existing receiver-recorder designed for connection to a plurality of multiple document reader stations.

Yet still another object of the invention is to provide a data collection system of the above character in which the time between transmissions during peak loads is minimized.

Yet still a further object of the invention is to provide a data collection system of the above character wherein a faulty transmission from one reader-transmitter will not interfere with transmissions from other reader-transmitters.

Another object of the invention is to provide means for detecting the occurrence of more than a predetermined number of pulses simultaneously on a plurality of data communication channels.

Other objects of the invention will in part be obvious and will in part appear hereinafter.

The invention accordingly comprises the means and features of operation and combinations of functions, and the relation of one or more of such operations and functions with respect with each of the others of the system; and apparatus embodying features of construction, combinations of elements and arrangements of parts which are adapted to effect such operations and functions, all as exemplified in the following detailed disclosure.

The scope of the invention will be indicated in the claims.

*Figures*

For a more complete understanding of the nature and objects of the invention, reference should be had to the following detailed description, taken in connection with the accompanying drawings, in which.

Figure 2:
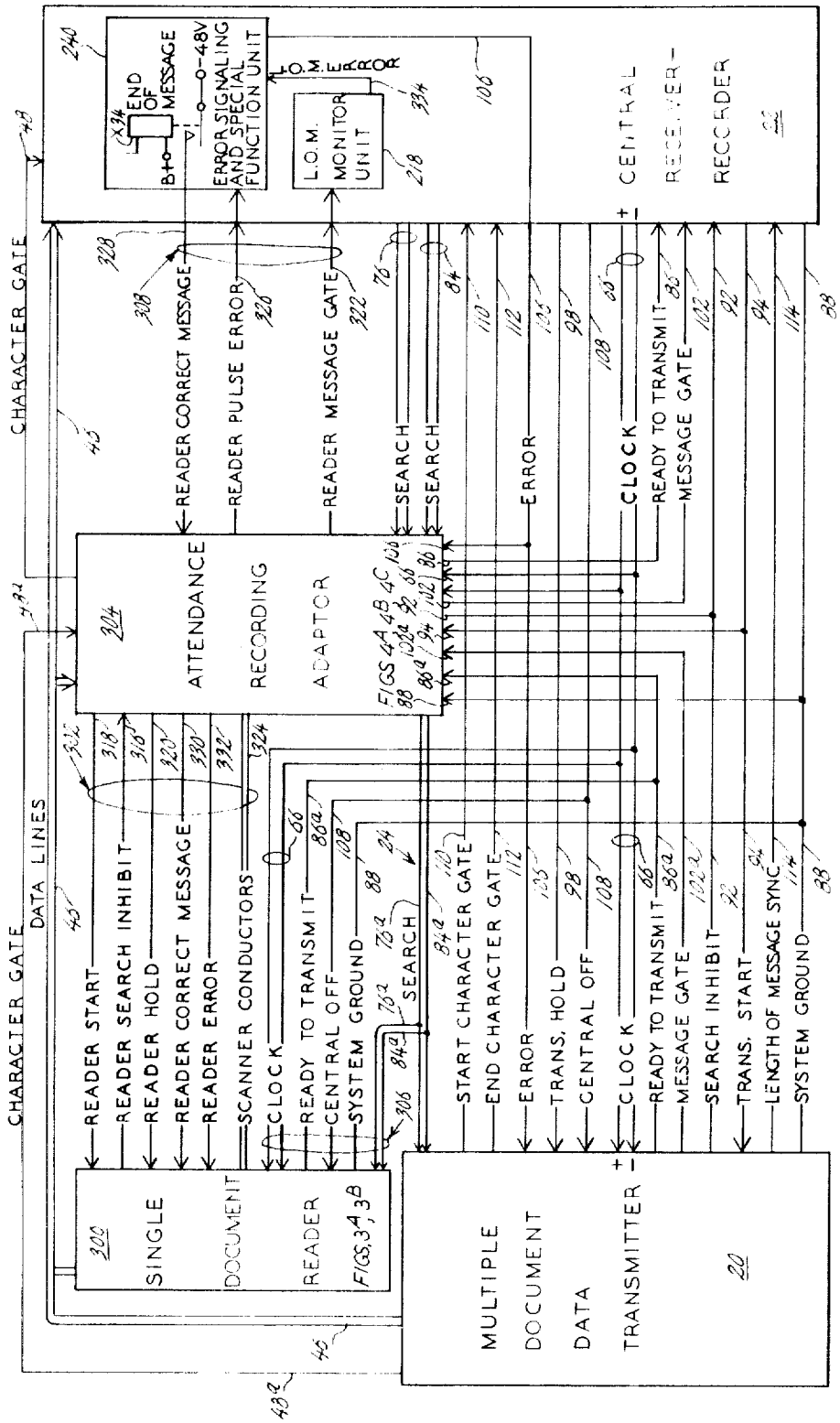
FIGURE 2 is a schematic wiring diagram partly in block form of the system of FIGURE 1.
Figure 3B:
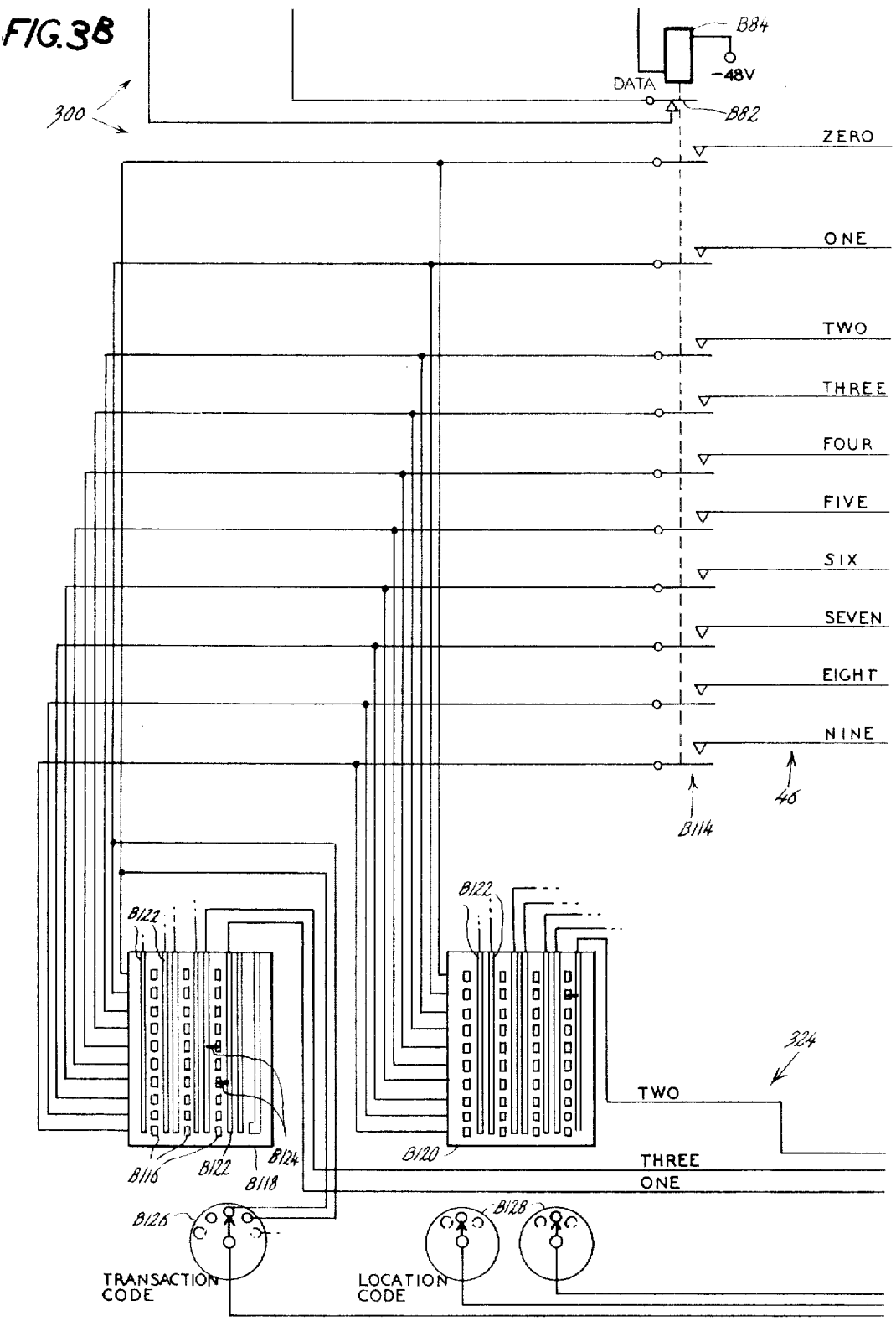

FIGURES 3A and 3B, which may be joined together in the manner shown in FIGURE 5, are a schematic diagram of the single document reader of FIGURE 2;

FIGURES 4A, 4B and 4C, which may be joined together in the manner shown in FIGURE 5, are a schematic diagram of the attendance recording adaptor of FIGURE 2;

FIGURE 5 is a diagram showing how FIGURES 3A, 3B, 4A, 4B, and 4C may be joined together to form a unitary schematic diagram of the single document reader and attendance recording adaptor of FIGURE 2;

FIGURE 6 is a front view of a workman's identification badge according to the present invention; and, FIGURE 7 is a side view of the badge of FIGURE 6.

Figure 1:
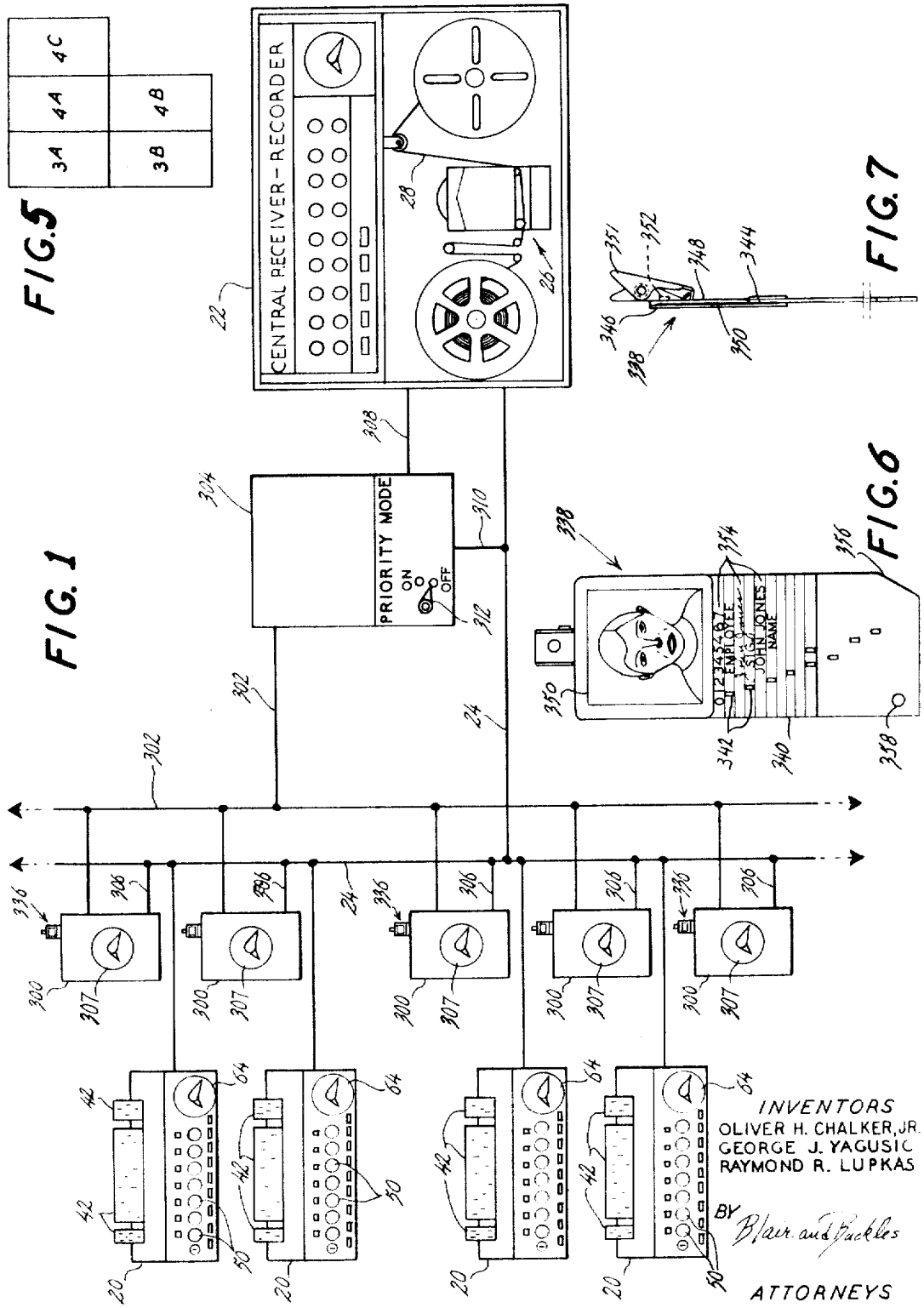
FIGURE 1 is an overall block diagram of the preferred embodiment of a data collection system incorporating a plurality of single document readers and an adaptor therefor specifically for attendance recording according to the present invention.

Reference should be had to the above-identified copending application Serial Number 863,227 and particularly to FIGURES 4 and 15 thereof for detailed disclosure of the circuitry of the multiple document reader and of the receiver-recorder illustrated in FIGURES 1 and 2 hereof.

Reference should be had to the above-identified copending application Serial Number 196,672 for a detailed description of mechanical elements of the single document reader illustrated in FIGURES 1 and 2 hereof.

The same reference characters refer to the same elements in the several views of the drawings.

*General description*

Referring now to FIGURE 1, the data collection system of the present invention comprises a plurality of multiple document data transmitters 20 connected in parallel by means of a common communication cable 24 to a central receiver-recorder 22. Each of the multiple document data transmitters is capable of accepting a plurality of data cards 42 on which information that may be read by the data transmitters 20 is recorded. The data is preferably recorded by means of punched holes in the data cards 42.

Each data transmitter 20 also includes a plurality of variable dials 50 which may be set to various positions to indicate variable information. The information contained in the punched cards 42 and the settings of the variable dials 50 is transmitted over the common communication cable 24 to the central receiver-recorder 22. At the central receiver-recorder the information is recorded on punched tape 28 by means of tape punch 26. Each data transmitter preferably includes a secondary clock 64 controlled from the receiver-recorder 22.

The system and apparatus of the multiple document transmitters 20, common cable 24 and central receiver-recorder 22 is disclosed in detail in the above-identified copending applications Serial Numbers 841,926, now Patent No. 3,109,089 and 863,227. The central receiver-recorder 22 preferably includes the apparatus disclosed in the above-identified copending applications Serial Numbers 163,153, now Patent No. 3,249,917 and 205,659, now Patent No. 3,268,870.

Additionally, in the present invention there is provided a plurality of single document readers 300 connected by means of a common control cable 302 to an attendance recording adaptor 304. Each single document reader 300 is also connected to selected conductors of the common communication cable 24 at cable 306. The single document readers preferably include a recording clock 307 controlled from the receiver-recorder 22.

The mechanical apparatus of the single document readers 300 is described in detail in the above-identified copending application Serial No. 196,672.

The attendance recording adaptor 304 is connected to the central receiver-recorder by adaptor cable 308. A further control and communication cable 310 is connected to the adaptor 304 and is spliced into or connected to selected conductors of the common communication cable 24.

The attendance recording adaptor 304 comprises a priority mode switch 312. When this switch is in the "off" position as shown, the multiple document data transmitters 20 and single document readers 300 all may be conditioned for transmission by the central receiver-recorder 22 in the manner described in the above-identified copending application Serial No. 863,227.

When the priority mode switch 312 is manually set to the "on" position and a single document reader 300 has been conditioned for transmission, only predetermined single document data readers 300 may be conditioned for transmission until a predetermined period of time after the initiation of transmission from the last requesting single document reader. During this period the single document readers are conditioned for transmission by the attendance recording adaptor. Thereafter all readers and transmitters may be conditioned for transmission by the receiver-recorder until a request for transmission is received from another single document reader 300. This priority mode is especially useful when the single document readers 300 are used to read "workmen's identification badges" as workmen check in or out of a plant.

Means are also provided at the attendance recording adaptor 304 for automatically placing the adaptor in this "priority mode" for predetermined periods of time, for example, at the beginning and end of a work shift.

Common means are provided at the attendance recording adaptor 304 for scanning the documents read by the single document readers 300. This is in contrast to the individual scanning means provided at each of the multiple document transmitters 20 described in the above-identified applications Serial Numbers 863,227 and 841,926 now Patent No. 3,109,089.

The adaptor 304 also comprises detecting means for detecting more than a predetermined numbr of simultaneous data pulses on the data lines of the common communication cable 24 when a single document reader 300 is transmitting to the central receiver-recorder 22. Further means are provided at the adaptor 304 for disconnecting any reader 300 from the system a predetermined time after transmission has been initiated therefrom.

Each single document reader 300 includes a memory for storing the information read from the documents inserted therein. Means are provided at the reader for insuring that this memory has been fully actuated by only one document before the reader may be conditioned for transmission. Further means are provided to require an operator to reinsert a document in a reader if the memory has not been fully actuated thereby.

Means are provided at the readers 300 and adaptor 304 so that if an error is detected in a message from a reader, a signal is provided indicating this to the operator thereof. In the preferred embodiment of the invention a hole is provided in the documents read by the readers 300. If an error is detected, a locking pin remains in the hole in the document in the reader until a release button is depressed by the operator. Thus, the operator must acknowledge that an error has occurred and that the message must be retransmitted.

The communication and control cables

Now referring to FIGURE 2, the conductors of the common communication cable 24 connected to the central receiver-recorder 22 serve the same function as those disclosed in the above-identified copending application 863,227, and are connected to the central receiver-recorder 22 in the same manner as those shown in the said copending application. Cable 24 comprises: a plurality of data lines 46 over which characters transmitted to the central receiver-recorder 22 are indicated by various combinations of data pulses; a character gate conductor 48 over which a character gate signal is transmited to the central receiver when characters are being transmitted to it; positive and negative clock conductors 66 over which pulses are transmitted from the receiver 22 to the secondary clocks 64 of the data transmitters 20 (see FIGURE 1); and a system ground conductor 88.

The conductors of the common communication cable 24 are either connected directly to each of the multiple document data transmitters 20 or are connected to the attendance recording adaptor 304 in which case a corresponding conductor connects the multiple document data transmitters 20 to the attendance recording adaptor 304. The reference numbers used herein for those conductors are the same as the reference numbers used for the corresponding conductors connected to the central receiver-recorder, but are followed by the lower case letter "a." The signal transmitted over each of these conductors is in some way qualified by the attendance recording adaptor 304. These qualifications will be discussed below in the detailed description of the adaptor.

The function of the various conductors of the common communication cable 24 may be understood by considering the sequence of operations involved in conditioning a multiple document data transmitter 20 for transmission, and thereafter initiating transmission therefrom to the central receiver-recorder 22.

When an operator has inserted the required plurality of data cards 42 (FIGURE 1) into a transmiter 20 and set its variable dials 50 in the requisite manner, he depresses a transmit bar (not shown). Thereupon the multiple document data transmitter 20 grounds ready to transmit conductor 86a. Normally conductor 86a is connected directly to the ready to transmit conductor 86 at the adaptor 304, and the signal is immediately received by the central receiver-recorder 22. A stepping switch (not shown) in the central receiver-recorder 22, in response to this signal, sequentially connects in circuit combinations of conductors, each comprising one conductor from a plurality of search conductors 76 and another conductor from a plurality of search conductors 84. Normally these conductors are connected in the adaptor 304 directly to a corresponding plurality of search conductors 76a and 84a. In each of the multiple document data transmitters 20 a '"location" relay is connected to one of the search conductors 76a and one of the search conductors 84a. When these two conductors are connected in circuit by the stepping switch at the central receiver-recorder 22, energizing the location relay, the multiple document data transmitter is "located," and it sends to the central receiver-recorder a search inhibit ground signal on search inhibit conductor 92. This stops the action of the stepping switch in the central receiver-recorder.

This search function may be carried on while another data transmitter 20 is in the process of transmission. When the central receiver-recorder 22 is ready to receive the next transmission, it transmits a negative 48-volt D.C. signal on transmitter hold conductor 98, and a short negative 48-volt D.C. pulse on transmitter start conductor 94. These signals initiate transmission from the located data transmitter 20.

The transmitting data transmitter then grounds transmitter message gate conductor 102a. This ground is applied to message gate conductor 102 at the attendance recording adaptor 304 indicating to the central receiver-recorder 22 that a message is being transmitted.

As the plurality of data cards 42 (FIGURE 1) in the multiple document data transmitter 20 are being read, a transmitter character gate ground signal is transmitted on conductor 48a. This ground is supplied to character gate conductor 48 at the attendance recording adaptor 304.

At the beginning of the scanning of the variable dials 50 (FIGURE 1) of the data transmitter 20, start character gate conductor 110 is grounded and at the end of scanning, end character gate conductor 112 is grounded.

At a predetermined time during the message a length of message sync pulse is transmitted to the central receiver-recorder on length of message sync conductor 114. This indicates that the character then being transmitted is a number corresponding to the number of characters that should be transmited during the message. If this number agrees with the actual number of characters received by the central recorder 22, and if no other errors have occurred during the message, the central receiver-recorder 22 discontinues the transmitter hold signal on transmitter hold conductor 98, and this ends transmission from the data transmitter 20. However, if an error has occurred, an error signal is transmitted from the central receiver-recorder 22 to the data transmitter 20 on error conductor 106, and an audible or visible alarm is energized to notify the operator of the error.

If during a transmission from a data transmitter 20 the central receiver-recorder 22 should receive another ready to transmit signal on conductor 86, its stepping switch will search and locate the next ready transmitter so that no time is required between transmissions for the searching operation.

Central off conductor 108 is normally energized at negative 48-volts D.C. potential by the central receiver-recorder 22. If for some reason the central receiver-recorder is not ready to receive any messages, this signal is discontinued and an appropriate signal is presented at the data transmitters 20.

For a fuller understanding of the apparatus and operation of the multiple document data transmitters 20 and the central receiver-recorder 22, reference should be had to the above-identified copending application Serial Numbers 863,227; 163,153; now Patent No. 3,249,917; and 205,659, now Patent No. 3,268,870.

Each single document reader 300 is connected to the clock lines 66 of the common communication cable 24 if the reader 300 includes a time indicating secondary clock 307 (FIGURE 1). Each reader is connected to the central off conductor 108 and to the system ground conductor 88. When a document has been inserted properly in a single document reader 300, the reader applies a ground to ready to transmit conductor 86a and normally this is supplied to the central receiver-recorder 22 on ready to transmit conductor 86. A location relay in the calling single document reader 300 is thereupon energized over search conductors 76a and 84a in the manner above described with reference to the multiple document data transmitters 20. The reader 300 thereupon grounds a common reader search inhibit conductor 316 of the common control cable 302. The reader 300 will thereupon be fully conditioned for transmission upon receiving simultaneously negative 48-volt D.C. signals on reader start and reader hold conductors 318 and 320, respectively.

When the central receiver-recorder 22 is ready to receive the message, it transmits a transmitter start signal on conductor 94. This signal initiates operation of a common scanning means at the attendance recording adaptor 304.

Reception of the transmitter start signal on conductor 94 at the adaptor 304 causes the adaptor to ground message gate conductor 102, character gate conductor 48 and a reader message gate conductor 322 of the adaptor cable 308. The common scanning means at the attendance recorder adaptor 304 thereupon successively grounds each of a plurality of scanner conductors 324 of the common control cable 302. This results in the serial transmission of the characters recorded on the document inserted in the single document reader 300 over the data lines 46 to the central receiver-recorder 22. The data lines which are used for transmissions from the reader 300 are monitored at the adaptor 304. If more than a predetermined number of pulses are transmitted simultaneously during a reader transmission, the adaptor 304 produces a reader pulse error signal on reader pulse error conductor 326.

At the beginning of the scanning operation, the reader start signal is discontinued on conductor 318 and at the end of the scanning operation, the reader hold signal is discontinued on reader hold conductor 320.

If no error has occurred during the transmission, energization of the end of message relay X34 of the central receiver-recorder 22 (whose operation is fully described with reference to FIGURE 13 of the above-identified copending application Serial No. 863,227) supplies a momentary negative 48-volt D.C. reader correct message signal to the attendance recording adaptor on conductor 328 of the adaptor cable 308. The attendance recording adaptor 304 then transmits a ground signal on reader correct message conductor 330 of the common control cable 302, and the reader 300 is thereupon disconnected. However, if an error has occurred, the error signal on conductor 106 originating at the central receiver-recorder 22 will cause the attendance recording adaptor 304 to transmit a reader error ground signal on reader error conductor 332 of the common control cable 302. Reception of this error signal at the transmitting single document reader 300 energizes an error indicating means thereat and prevents further transmission from the document reader until a release button is depressed by the operator thereof to acknowledge that an error has occurred. Means are provided at the single document reader so that if desired the single document may be held in the reader until reception of the correct message signal on conductor 330 or until operation of the release button after reception of a reader error signal.

At the central receiver-recorder 22, reader message gate conductor 332 is connected to the length of message monitor unit 218. The reader message gate signal is discontinued by the adaptor 304 at the end of the scanning period. The length of message monitor unit upon the termination of the reader message gate signal compares the number of characters actually received with a predetermined number in the manner described with reference to checking the length of the central message in the above-identified copending application Serial No. 863,227 or with a length of message character transmitted from the document reader 300 at a predetermined time during the message in the manner described in the above-identified copending application Serial No. 205,659. If the number of characters received disagrees with the predetermined or received length of message number, a length of message error signal is produced on conductor 334 and supplied to the error signalling and special function unit 240 for use thereat in the manner described in my above-identified copending application Serial No. 863,227.

It should be kept in mind that a plurality of multiple document data transmitters 20 may be connected in parallel to the conductors of the common communication cable 24 shown connected to the data transmitter 20 illustrated in FIGURE 2. Similarly, a plurality of single document readers 300 may be connected in parallel to the conductors 306 of the common communication cable 24 and to the common control cable 302. The total number of document readers 300 and multiple document data transmitters 20 which may be connected to a single central receiver-recorder 22 is thus limited only by the number of combinations of search conductors 76a and 84a available.

*The single document reader*

Now referring to FIGURE 3, comprising FIGURES 3A and 3B which may be joined to form FIGURE 3 as shown in FIGURE 5, the single document reader generally indicated at 300 comprises a central off relay B2. Relay B2 is connected for energization to the central off conductor 108 and to the system ground conductor 88 of the common communication cable 24 (FIGURES 1 and 2). Since central off conductor 108 is normally energized at minus 48-volts D.C. potential when the central receiver-recorder 22 (FIGURE 2) is in condition to receive messages, the armature B4 of relay B2 normally grounds conductor B6. This energizes ready light B8 which is connected between conductor B6 and a source of plus 5-volt D.C. potential. It should be noted here that all relays and switches shown in FIGURE 3 and in the other drawings of this application are shown in their de-energized or deactuated states, respectively.

Still referring to FIGURE 3A, when the operator inserts a document 336 into the single document reader 300 switch B10 is engaged by the diagonally cut corner thereof and opens. This opens a circuit to solenoid B12 which, when energized, restores the document reading mechanism of the single document reader 300 to its normal or rest condition. As the document 336 is inserted farther into the reader 300, unit reset switches B14 and B16 are closed by control fingers 452—452 which are engaged by the document 336. When unit reset switch B14 closes, it connects unit reset relay B18 between ground and a source of minus 48-volts D.C. potential. Energization of relay B18 closes contacts B24 thereof. A 100 ohm resistor B20 and a 25 microfarad capacitor B22 are connected in series across relay B18. Thus, if the operator withdraws the documents 336 before full insertion thereof, switch B10 will close and contacts B24 of unit reset relay B18 will remain closed for approximately 240 milliseconds as capacitor B22 discharges through resistor B20 and relay B18. This completes a circuit through switch B10, contact B24 and a normally closed pawls out switch B26 connecting restore solenoid B12 to a source of 115-volts A.C. potential, and the sensing mechanism of the reader 300 will be restored to its rest position.

If, however, the document 336 is further inserted into the reader 300, the sensing fingers thereof (not shown) will engage the data holes in the document 336 and be moved into reading position. As the last of the sensors moves off its home or rest position, actuating arm 476 transfers all sensors off home switch B28 so as to connect ready to transmit relay B30 in series with slide down switch B32. When the document 336 is fully inserted, slide down switch B32 is closed and a circuit to ground is completed through conductor B34, relay armature B36, conductor B38, relay armature B40, conductor B42, relay armature B44 and system ground conductor 88 to energize ready to transmit relay B30.

As the sensors move off their home positions, they are engaged by a plurality of pawls that allow the sensors to move only in the direction of further insertion of the document 332. At the time slide down switch B32 is closed, the pawls are latched to engage all of the sensors of the document reader 300 to hold them in their attained positions which are indicative of the information carried by the punched holes in the document 336. When the pawls are latched, pawls out switch B26 is opened to prevent energization of the restore solenoid B12. If no mechanism is provided for retaining the document 336 in the reader, it may now be withdrawn and the information read by the sensors may be scanned in a manner to be fully explained below. In many situations, however, it is highly desirable that the document 336 be retained in the reader until the information has been transmitted to the central receiver-recorder, processed, and an indication has been transmitted to the document reader 300 that the message is correct or incorrect. In this case, a latch mechanism B46 is provided to retain the card in the reader.

If all of the sensors of the reader have not engaged holes in the document 336, all sensors off home switch B28 will not have been transferred and ready to transmit relay B30 will not be energized. Then, when slide down switch B32 closes, the ground on conductor B34 will be supplied to a repeat light B48. Repeat light B48 which is connected between switch B28 and a source of plus 5-volts D.C. potential thus energizes. This indicates to the operator that some error has occurred, that he must depress a manual release switch B50 to remove the document 336, and that the document should thereafter be reinserted into the reader 300.

When the release switch B50 is closed, a ground will be supplied to a correct message relay B52 over conductor B54, release switch B50, conductor B56, armature B58 of ready to transmit relay B30, conductor B60 and relay armature B62. Correct message relay B52 will energize since it is now connected between ground and a source of minus 48-volts D.C. potential through unit reset switch B16 which operated when the document 336 was first inserted in the reader 300. Armature B64 of correct message relay B52 then connects a release solenoid B66 to a source of 115-volts alternating current potential. Release solenoid B66 causes latch mechanism B46 to release document 336 and releases the pawls from the sensors. Pawls out switch B26 then closes. Restore solenoid B12 is energized in the manner previously described to restore all the sensors to their rest positions.

It will thus be seen that before the ready to transmit relay B30 is operated, the document reader 300 tests to see that a hole has been punched in every column of the document 336, that each of the holes has been engaged by a sensor, and that the document has been fully inserted into the reader 300. If these tests are not met, a visual signal is presented to the operator which must be acknowledged by pressing the release switch B50 before the document may be removed from the reader. Furthermore, since energization of the correct message relay B52 by operation of the release switch B50 causes armature B44 of relay B52 to connect relay B52 to ground, relay B52 will remain energized until unit reset switch B16 opens upon full withdrawal of the document 336. For a detailed description of the mechanical elements of the single document reader 300, reference should be had to the above-identified copending application Serial No. 196,672.

Still referring to FIGURE 3A, as described above, ready to transmit relay B30 will energize when all sensors are off home, thereby transferring switch B28, and the document 336 is fully inserted to close slide down switch B32. Upon energization, armature B58 of ready to transmit relay B30 will supply a ground to transmitting light B68 which will be illuminated. This indicates to the operator that a transmission is in progress, all conditions for transmission having been met. Contacts B70 of relay B30 will now supply a ground to armature B72 which grounds ready to transmit conductor 86a, indicating to the attendance recording adaptor 304 (FIGURE 2) that either a single document reader 300 or multiple document data transmitter 20 is ready for transmission. Energization of ready to transmit relay B30 also disconnects armature B58 from conductor B56 so that closure of the release switch B50 will no longer energize correct message relay B52.

In a manner to be described more fully below under the heading "Priority Mode," either the central receiver-recorder 22 or the attendance recording adaptor 304 will successively ground one conductor in each of a plurality of search conductors 76a and 84a (FIGURE 3A). Single document reader 300 is connected to one conductor of search conductors 76a at terminal board B74 and to one conductor of search conductors 84a at terminal board B76. A location relay B78 is connected in series with normally open contacts B80 of ready to transmit relay B30 and normally closed contact B82 of data relay B84 (FIGURE 3B). Location relay B78 is connected to terminal board B74. Contacts B82 are connected to terminal board B76. Location relay B78 is therefore energized upon proper energization of the search conductors 76a and 84a to which it is connected at terminal boards B74 and B76.

Energization of relay B78 closes contacts B86 thereof to ground reader search inhibit conductor 316. In a manner to be described more fully below, this either discontinues searching at the attendance recording adaptor 304 or causes the adaptor to send a search inhibit signal to the central receiver-recorder to inhibit searching thereat. Thus, the location relay B78 will remain energized.

When contacts B88 of relay B78 close they connect reader transmit relay B90 in circuit between reader start conductor 318 and system ground 88. Since reader start conductor 318 is normally supplied at the attendance recording adaptor with minus 48-volts D.C. potential, reader transmit relay B90 energizes. Contacts B92 thereof, close to connect reader transmit relay B90 between system ground 88 and reader hold conductor 320, which is also normally energized at minus 48-volts D.C. potential. Thus, reader transmit relay B90 will remain energized so long as this signal is supplied on reader hold conductor 320.

Closure of contacts B94 of reader transmit relay B90 connects data relay B84 (FIGURE 3B) between a source of minus 48-volts D.C. potential and system ground 88. Data relay B84 energizes and the contacts B82 thereof open the energization circuit of location relay B78 which thereupon de-energizes. This discontinues the search inhibit signal on conductor 316 and disconnects the reader transmit relay B90 from the reader start conductor 318. Armature B72 of reader transmit relay B90 no longer supplies ground to the ready to transmit conductor 86a. This ground is now supplied to conductor B96.

Reception of the reader search inhibit signal at the adaptor 304, in a manner to be described below, discontinues the reader start signal on conductor 318 for the duration of the transmission from the reader whose location relay B78 energized. Thus, after termination of the reader search inhibit signal on conductor 316, the central receiver 22 or adaptor 304 will be responsive to another ready to transmit signal on conductor 86a to locate another reader 300 and the reader transmit relay B90 thereof will not energize until restoration of the reader start signal at the termination of the message in progress.

A transmitting relay B98 is connected between conductor B96 and a source of minus 48-volts D.C. potential and it therefore energizes. This transfers armature B36 of transmitting relay B98, opening the ground circuit to ready to transmit relay B30 which thereupon de-energizes. Armature B36 now supplies a ground to conductor B96 so that transmitting relay B98 remains energized. Further, when transmitting relay B98 energizes, armature B62 thereof supplies a ground to transmitting light B68 so that it remains illuminated even after ready to transmit relay B30 de-energizes.

Closure of contacts B100 and B102 of transmitting relay B98 connects conductors B104 and B106 to reader error and reader correct message conductors 332 and 330 respectively. However, conductors B104 and B106 are connected in series with contacts B108 and B110, respectively, of reader transmit relay B90. Therefore, a reader correct message signal will not at this time energize correct message relay B52 and a reader error signal will not at this time energize error relay B112.

Now referring to FIGURE 3B, when data relay B84 energizes, a plurality of contacts thereof, collectively indicated as B114, connect the numeric conductors "ZERO," "ONE," "TWO," "THREE," "FOUR," "FIVE," "SIX," "SEVEN," "EIGHT" and "NINE" of the data lines (collectively designated as 46) to the corresponding rows of contacts of circuit boards B118 and B120. For example, contacts B116 are connected to the NINE conductor. Each circuit board contains a plurality of column conductors B122 which are each connected to a different one of the scanner conductors 324 of the common control cable 302. The sensors of the single document reader 300 include wiper contacts B124 which are selectively positioned in accordance with the position of the holes in the document 336 inserted into the reader to connect each column conductor B122 to one numerical row conductor. The structure and operation of wiper contacts B124 is fully disclosed in copending application Serial No. 196,672.

There is further provided a transaction code switch B126 accessible to the operator, and a plurality of presettable location code switches B128 inside the single document reader 300. The stationary contacts of the switches B126 and B128 are each connected to a different one of the numerical data lines 46 and the wipers of switches B126 and B128 are each connected to a different one of the scanner conductors 334.

When the attendance recording adaptor 304 is ready to cause transmission from attendance recorder 300, the scanner conductors 324 are individually and sequentially grounded. This results in a series of grounds being supplied to the numeric data conductors 46 corresponding to the position of the wipers of the switches B126 and B128, and the position of the sensor wipers B124. Thus the type of transaction, for example clocking in or clocking out; a number indicating which single document reader is originating the transmission; and the information recorded on the document 336 are all transmitted via the data conductors 46 to the central receiver-recorder 22 (FIGURE 2). At the end of the scanning operation, as will be discussed in detail below, the minus 48-volt D.C. signal on reader hold conductor 320 is discontinued. As the negative 48-volts D.C. potential on the reader start conductor 318 had previously been discontinued, reader transmit relay B90 (FIGURE 3A) de-energizes. Contacts B94 thereof open, de-energizing data relay B84 (FIGURE 3B). Contacts B114 of data relay B84 open, disconnecting circuit board B118 and B120 from data conductors 46.

Referring again to FIGURE 3A, contacts B108 and B110 of reader transmit relay B90 now close. Error relay B112 is thus connected through contacts B108, conductor B104, and contacts B100 of transmititng relay B98, to reader error conductor 332. Further, correct message relay B52 is connected through conductor B54, contacts B110, conductor B106, and contacts 102 of transmitting relay B98 to reader correct message conductor 330.

If no error has occurred in the message, the central receiver-recorder 22 (FIGURE 2) transmits a reader correct message signal on conductor 328 to the attendance recording adaptor 304 which then grounds reader correct message conductor 330 of the common control cable 302 to energize relay B52 of FIGURE 3A. Armature B44 of correct message relay B52 then supplies a ground to conductor B54 so that correct message B52 remains energized until unit reset switch B16 opens upon restoration of all sensors to their home position. The ground to transmitting relay B78 via armature B44, conductor B42, armature B49 of error relay B112, conductor B38, armature B36 of transmitting relay B98 is discontinued and it de-energizes.

Closure of contacts B64 of correct message relay B52 completes the circuit to release solenoid B66 to release the latching mechanism B46 and to remove the pawls from the sensing fingers closing pawls out switch B26 by means of actuator 462. Switch B26 completes a circuit through contacts B24 of unit reset relay B18 and switch B10 when the document 336 is removed from the reader 300 to energize restore solenoid B12. Solenoid B12 returns all sensors to their home position, whereupon reset switches B14 and B16 open to de-energize unit reset relay B18 and correct message relay B52.

If an error has occurred in the message transmitted from the single document reader 300, no ground is supplied on reader correct message conductor 330. Instead, a ground is supplied on reader error conductor 332 by the attendance recording adaptor 304 (FIGURE 2) in response to an error signal on error conductor 106 of the common communication cable 24. This ground is supplied through contacts B100 of transmitting relay B98, conductor B104, contacts B108 of reader transmit relay B90 to error relay B112. Upon energization of error relay B112, armature B40 thereof supplies a ground to error relay B112 so that it remains energized after discontinuance of the reader error signal. Contacts B130 of error relay B112 close to supply a ground to illuminate repeat light B48. Latching mechanism B46 either retains the inserted document 336 or prevents insertion of another document. Only after the operator has acknowledged that an error has occurred by closing release switch B50 will correct message relay B52 energize to cause the single document reader 300 to release and restore its sensing mechanism in the manner previously described. When the correct message relay B52 energizes, its armature B44 will supply a ground to conductor B54 so that relay B52 will remain energized until unit reset switch B16 opens upon full restoration of the sensors to their home position. Furthermore, armature B44 will no longer supply ground to error relay B112 which de-energizes, causing the repeat light B48 to go out.

It will thus be seen that means are provided in the single document reader 300 to assure that a document 336 has been properly inserted therein and that data is being sensed in every column thereof before transmission of a ready to transmit signal to the central apparatus of the system. If these conditions are not met a repeat signal is provided to the operator, and this signal must be acknowledged by him before the document may be withdrawn or reinserted into the reader 300. It will further be seen that means have been provided for conditioning each of a plurality of document readers for transmission upon reception of simultaneous hold and start signals and thereafter a continuous hold signal so that another document reader may be conditioned for transmission during transmission from a first document reader. It will further be seen that at the end of transmission from the document reader, means are provided receptive to either a correct message or an error signal. Upon reception of the correct message signal, the document reader 300 is released so that a document inserted therein may be removed, or another document inserted for transmission, and the sensing means thereof are restored to their initial position. If the error signal is received, the operator is notified and must acknowledge it before the document inserted into the document reader 300 will be released or before another document may be inserted.

It will further be seen that a mechanical memory device has been provided for retaining the information contained on the document inserted into the document reader. This information is sequentially transmitted to the central recording means of the data collection system at a later time in response to signals from a common control means.

*The attendance recording adaptor*

The attendance recording adaptor 304 of FIGURE 2 is shown in detail in FIGURE 4, comprising FIGURES 4A, 4B and 4C which may be joined together to form FIGURE 4 in the manner shown in FIGURE 5. Furthermore, FIGURE 3 may be joined with FIGURE 4 in the manner shown in FIGURE 5 to show the entire single document reader attendance recording adaptor circuit. As in FIGURE 3, all of the relay contacts and switches of FIGURE 4 are shown de-energized or in their normal position when no transmission is in progress.

Specifically referring to FIGURES 4A and 4C, the ready to transmit conductor 86a is normally connected to the ready to transmit conductor 86 by way of normally closed relay contacts A2 and A4. Thus a ready to transmit signal either from a single document reader 300 or from a multiple document data transmitter 20 is normally transmitted to the central receiver-recorder 22 (FIGURE 2). The central receiver-recorder in the manner fully described in the above-identified application Serial No. 863,227 will then successively connect each of the search conductors 84 to ground while successively connecting each of the search conductors 76 to a source of minus 48-volts D.C. potential.

Still referring to FIGURE 4C, each of the search conductors 76 is connected to a corresponding one of the search conductors 76a at relay transfer contacts collectively indicated as A6. Each of the search conductors 84 is connected to a corresponding one of the search conductors 84a at relay transfer contacts A8. Thus, a single document reader 300 or a multiple document transmitter 20, which is ready to transmit and which is connected to the combination of the search conductors 76a and 84a first connected in circuit at the recorder 22, will be conditioned for transmission. If this is a multiple document data transmitter 20, that transmitter will supply a ground signal on search inhibit conductor 92 (FIGURE 2) which will cause the searching at the central receiver-recorder 22 to cease in the manner described in the above-identified copending application Serial No. 863,227.

When it is the turn of a ready to transmit single document reader 300, its location relay B78 (FIGURE 3A) will energize and it will supply a ground signal on reader search inhibit conductor 316. The ground signal on reader search inhibit conductor 316 will energize reader on line relay A10 in the upper lefthand corner of FIGURE 4A. Contacts A12 thereof will close, energizing reader on line slave relays A14 and A16. Contacts A18 of reader on line relay A10 will also close, supplying a ground to search inhibit conductor 92 connected to the central receiver-recorder 22 (FIGURE 2).

Upon energization of reader on line slave relay A14, contacts A20 thereof will close, supplying a ground to reader search inhibit conductor 316 to keep reader on line relay A10 energized even when the reader search inhibit signal from the reader is discontinued. Contacts A22 of relay A14 also close to connect transmitter start conductor 94 of the common communication cable 24 (see FIGURE 2) to the grid of triode A24.

When the central receiver-recorder 22 is ready to receive the message (this may be after the recording of time and other central information as described in the above-identified application Serial No. 863,227), it momentarily supplies a minus 48-volt D.C. signal on transmitter start conductor 94.

Triode A24 is normally conducting since its grid is connected to the cathode thereof and to ground through resistor A26. The plate of triode A24 is connected to the grid of a second triode A28 through a resistor A30. The plate of triode A24 is also connected to a source of plus 250-volts D.C. potential through a resistor A32. The grid of triode A28 is also connected to a source of minus 150-volts D.C. potential through a resistor A34. When triode A24 is normally conducting, the grid of triode A28 is biased negative and it is cut off.

However, during reception of the negative 48-volt D.C. potential on transmitter start conductor 94, triode A24 is cut off, thereby driving the grid of triode A28 positive. Triode A28 conducts to energize reader start relay A38 through plate resistor A36. Thus, contacts A40 of relay A38 close during reception of the transmitter start signal on conductor 94.

Triode A24 may be one-half of a type 5953 and triode A28 may be one-half of a type 5687. With these tube types, resistor A26 should be approximately 100 kilohms, resistor A30 approximately 560 kilohms, and resistor A34 approximately one megohm, all plus or minus five percent rated at one-half watt. Resistor A32 should be approximately 100 kilohms plus or minus five percent rated at one watt, and resistor A36 should be approximately ten kilohms plus or minus five percent rated at five watts.

The momentary closure of contacts A40 in response to the transmitter start signal on conductor 94 completes an energization circuit to energize reader transmit relay A42. This circuit includes relay armature A44, conductor A46, relay armature A48, conductor A50, contact A40, conductor A52, reader transmit relay A42, conductor A54 and normally closed contacts A56.

Energization of reader transmit relay A42 closes contact A58 thereof to complete a self-energizing circuit to ground through conductor A50, relay armature A48, conductor A46, and relay armature A44, so that reader transmit relay A42 remains energized at the termination of the transmitter start signal on conductor 94.

Upon energization of reader transmit relay A42, contacts A60 thereof open to discontinue the energization circuit of reader on line relay A10. Thus, the search inhibit signal on conductor 92 is terminated and reader on line slave relays A14 and A16 de-energize.

The opening of contacts A22 of slave relay A14 disconects the transmitter start conductor 94 from the attendance recording adaptor so that reader start relay A38 cannot again be energized. Furthermore, the opening of contacts A20 of slave relay A14 insures that even after the reader transmit relay A42 de-energizes, in the manner to be described below, the reader on line relay A10 can only be energized in response to another reader search inhibit signal on conductor 316, from another reader.

Still referring to FIGURE 4A, upon energization of reader transmit relay A42, contacts A62 thereof at the bottom of FIGURE 4A open, thereby discontinuing the circuit to reader start conductor 318 so that no other reader can be connected to the data lines 46 (FIGURE 3). At the same time, normally open contacts A64 of reader transmit relay A42 close, thereby supplying alternating current energization on scanner start conductor A66 to scanner motor A68 of FIGURE 4B.

Referring now to FIGURE 4B, scanner motor A68 then starts and the wiper contacts A70 of a scanner A71 successively engage a plurality of contacts A72 each of which is connected to a different one of the scanner conductors 324 of the common control cable. This causes the transaction code, location code, and document code information to be transmitted, one character at a time, to the central receiver-recorder over the data lines 46.

When wiper A70 supplies a ground to the first contact A74 of the scanner, this ground is supplied via start pulse check conductor A76 to the grid of a triode A78. At the end of the scan, when wiper A70 engages contact A80 of the scanner, ground is supplied via end pulse check conductor A82 to the grid of triode A84. The operation of the pulse check circuitry of FIGURE 4B will be described in detail below.

At the very end of the scan, the wiper A70 will supply a ground via contact A86 of the scanner to end of scan conductor A88. The scanner A71 includes an off home circuit (not shown) which energizes motor A68 whenever wiper A70 is not at its home position shown in FIGURE 4B. Thus, once an initial energization is supplied to motor A68 on conductor A66, wiper A70 will make one complete revolution.

Referring again to FIGURE 4A, end of scan conductor A88 is connected to the grid of a triode A90. Normally triode A90 is not conducting, since its grid is biased negative through grid resistor A92 connected between the grid and a source of minus 48-volts D.C. potential. However, when the end of scan (ground) signal is supplied on conductor A88 to the grid of triode A90, it conducts and current flows through plate resistor A94 and end of scan relay A96 connected in series between the plate of triode A90 and a source of plus 250-volts D.C. potential.

The momentary energization of end of scan relay A96 opens normally closed contacts A56 thereof to discontinue the supply of minus 48-volts D.C. potential via conductor A54 to reader transmit relay A42. De-energization of reader transmit relay A42 opens contacts A58 thereof to disconnect relay A42 from its ground circuit so that it remains de-energized even after contacts A56 of end of scan relay A96 again close.

Energization of end of scan relay A96 also opens contacts A97 thereof to interrupt the circuit supplying minus 48-volts D.C. potential to reader hold conductor 320. The reader transmit relay B90 (FIGURE 3A) of the transmitting reader thereupon de-energizes.

When reader transmit relay A46 de-energizes, contacts A62 thereof close to again complete the circuit to reader start conductor 318. Contacts A64 of reader transmit relay A42 open to discontinue the supply of alternating current to scanner motor A68 (FIGURE 4B) so that the scanner stops with wiper A70 at its normal home position shown in FIGURE 4B. Furthermore, contacts A60 of reader transmit relay A42 close so that reader on line relay A10 is again responsive to a reader search inhibit signal on conductor 316 to remain self-energized through contacts A20 of reader on line slave relay A14.

During the period of scanning while reader transmit relay A42 was energized, the closure of contacts A58 thereof supplied a ground from conductor A50 through contacts A58 to conductor A52. Conductor A52 is connected through a diode A98 to message gate conductor 102; it is also connected through diode A100 to reader message gate conductor 322, and through diode A102 to character gate conductor 48. Each of the diodes A98, A100 and A102 may be Sarkes-Tarzian type 10.

Thus during the period of scanning, a message gate signal (ground), a reader message gate signal (ground), and a character gate signal (ground) were supplied on conductors 102, 322 and 48, respectively, to the central receiver-recorder 22 (see FIGURE 2). At the end of the scan when reader transmit relay A42 de-energized, these signals are discontinued.

Now referring to FIGURE 2 the reader message gate conductor 322 is connected to the length of message monitor unit 218 of central receiver-recorder 22. When the reader message gate signal, a ground, terminated, the length of message monitor unit 218 compared the number of characters received in the message with a predetermined number and if they disagreed, a length of message error signal was supplied to the error signaling and special function unit 240 via length of message error conductor 334, in which case an error signal (minus 48-volts) was supplied on error conductor 106. Furthermore, if a reader pulse error signal is transmitted at any time from the attendance recording adaptor 394 via reader pulse error conductor 326 to the error signaling special function unit 240, an error signal will be supplied to error conductor 106 of the common communication cable 24.

If no error has occurred in the message, the end of message relay X34 of the error signaling and special function unit will supply a negative 48-volt D.C. potential to reader correct message conductor 328 of the adaptor cable 308.

Again referring to FIGURE 4A, a reader correct message signal on conductor 328 energizes the reader correct message relay A106. Armature A108 thereof then supplies a ground signal for the duration of the reader correct message signal on conductor 328 to reader correct message conductor 330 of the common control cable connected to the readers 300. In the manner above described under the heading "Single Document Reader," the transmitting reader will then be reset so that it may accept another document for transmission.

If the message received by the central receiver-recorder is erroneous, the error signal on error conductor 106 of the common communication cable will energize error relay A110 of FIGURE 4A and armature A48 thereof will supply a ground to energize error slave relay A112. Contacts A114 of error slave relay A112 will close to supply a ground on reader error conductor 332 connected to the reader via common control cable 302 (FIGURE 1). This signal will light the repeat light of the transmitting reader in the manner previously described.

If an error other than a length of message error occurs during transmission of the message, as for example a short pulse or long pulse error, as described in the above-identified copending application Serial No. 863,227, or if reader pulse error occurs as determined in the manner described below, an error signal will be transmitted from the central receiver-recorder 22 on conductor 106. This will energize error relay A110 and error slave relay A112. An error signal will be supplied via reader error conductor 332 to illuminate the repeat light B48 of the transmitting reader. At the same time, the transfer of armature A48 of error relay A110 will disconnect the ground circuit of reader transmit relay A42 to de-energize reader transmit relay A42. This will discontinue the message gate reader, message gate, and character gate signals on conductors 102, 332 and 48, and will condition the attendance recording adaptor for transmission from another ready reader. The scanner off home self-energization circuit will return wiper A70 to its home position as shown in FIGURE 4B even though its energization circuit via contact A64 of reader transmit relay A42 (FIGURE 4A) has been discontinued.

Energization of the error slave relay A112 opens contacts A116 thereof to discontinue the supply of minus 48-volts D.C. energization to reader hold conductor 320 and reader start conductor 318, to prevent energization of the reader transmit relay B90 (FIGURE 3A) of a calling reader whose location relay B78 has been previously energized.

*The multiple pulse error detection circuitry.*—Now referring to FIGURE 4B, at the beginning of scanning a momentary ground is supplied on start pulse check conductor A76. This grounds the grid of triode A78 connected to conductor A76. Triode A78 is normally cut off due to the negative bias of its grid supplied by resistor A118 which is connected between the grid and a source of minus 48-volts D.C. potential. However, when the grid of triode A78 is grounded by the start pulse check signal, triode A78 conducts and energizes pulse check relay A120 through plate resistor A122. A second triode A124 is connected in parallel with triode A78. That is, the plates and cathodes of triodes A78 and A124 are connected. The grid of triode A124 is connected through a resistor A126 to a source of minus 48-volts D.C. potential. Thus, triode A124 is normally cut off. However, when pulse check relay A120 energizes, contacts A128 thereof close to ground the grid of triode A124 which now conducts. This continues the energization of relay A120.

Triodes A78 and A124 may each be one-half of a type 5963. Resistors A118 and A126 may then both be approximately 47 kilohms plus or minus five percent, rated at one-half watt and plate resistor A122 may be approximately 3.9 kilohms, plus or minus five percent, rated at two watts.

Energization of pulse check relay A120 closes contacts A130 thereof to complete a circuit between reader pulse error conductor 326 of the adaptor cable 308 and contacts A132 of a pulse error relay A134.

The data lines 46 which are used for transmissions from the readers 300, in this case the "ZERO," "ONE," "TWO," "THREE," "FOUR," "FIVE," "SIX," "SEVEN," "EIGHT" and "NINE" data conductors, are each connected to a different one of a plurality of relay circuits A136, A138, A140, A142, A144, A146, A148, A150, A152 and A154. Each of these circuits is identical and comprises, for example as illustrated in relay circuit A136, a triode A156 and a relay A158. The "ZERO" data line is connected to the grid of triode A156 and through a resistor A160 to a source of minus 48-volts D.C. potential. The plate of triode A156 is connected in series with a resistor A162 and relay A158 to a source of plus 250-volts D.C. potential. The cathode of triode A156 is connected to ground. Normally triode A156 is cut off. However, when a data pulse is received on the "ZERO" conductor grounding the grid of triode A156, it conducts to energize relay A158. When relay A158 energizes, the contacts A164 thereof close to connect a resistor A166 between the source of plus 250-volts D.C. potential and the grid of a triode A168.

Similarly, a pulse on any of the other data conductors 46 connects a corresponding resistor A170, A172, A174, A176, A178, A180, A182, A184, or A186, between the source of plus 250-volts D.C. potential and the grid of triode A168.

Triode A156 may be one-half of a type 5963, resistor A160 then is approximately 100 kilohms, plus or minus five percent, rated at one-half watt and resistor A162 is approximately 5.6 kilohms, plus or minus five percent, rated at 2 watts. Resistors A166–A186 are each approximately 820 kilohms, plus or minus five percent, rated at one-half watt. The other relay circuits A138–A154 are identical to relay circuit A136 and the components thereof have the same values as the components of relay circuit A136.

Now the grid of triode A168 is normally biased negative since it is connected to the midpoint of a voltage divider comprising resistors A188 and A190 which are connected in series between sources of plus 250-volts D.C. and minus 150-volts D.C. potential. Furthermore, the potential at the grid of triode A168 cannot go below minus 48-volts since it is connected to a source of various 48-volts potential through diode A192. Therefore, when no pulses are being received on the data lines 46, and none of the resistors A166 and A170–A186 are connected to the source of plus 250-volts, triode A168 is cut off. Now when a data pulse is received on, for example the "ZERO" data line, contacts A164 of relay A158 close to connect resistor A166 in parallel with resistor A188 between the source of plus 250-volts D.C. potential and the grid of triode A168. The potential at the grid of triode A168 now will be raised to approximately minus 17-volts D.C. but triode A168 will still be cut off. If, however, pulses are received on two of the data lines 46 simultaneously, two resistors, for example resistors A166 and A170, will be connected in parallel with resistor A188, and the grid of triode A168 will be raised to a positive enough potential to cause triode A168 to conduct, thus energizing pulse error relay A134 through plate resistor A194.

Triode A168 may be one-half of a type 5963. For this tube type, resistor A188 is approximately 820 kilohms, resistor A190 is approximately 200 kilohms, both plus or minus five percent, rated at one-half watt, and resistor A194 is approximately 3.9 kilohms, plus or minus five percent, rated at two watts. Diode A192 may then be a type U276.

When pulse error relay A134 energizes, its contacts A132 close to supply a ground via the closed contacts A130 of relay A120 to reader pulse error conductor 326. This tells the central receiver-recorder 22 that more than one pulse has been transmitted on data lines 46 at the same time. This is an error since for the code chosen for the documents read by the readers 300 only one pulse should occur at a time. The error signaling and special function unit 240 (FIGURE 2) will thereupon produce an error signal on conductor 106 and the transmission will be discontinued in the manner previously described.

After the scanner A71 has completed scanning the scanner conductors 324, a ground will be applied to the grid of triode A84 via wiper A70, scanner contact A80 and end pulse check conductor A82. This will be true whether a pulse error has occurred or not since, as previously described, the scanner includes a self-energization circuit so that even when an error occurs the wiper A70 is returned to its home position as shown in FIGURE 4B. Normally the grid of triode A84 is biased negative through grid resistor A196 which is connected between the grid of triode A84 and a source of minus 48-volt D.C. potential. However, when ground is applied to the grid of triode A84 it conducts, energizing end pluse check relay A198 through plate resistor A200. When contacts A202 of end pulse check relay A198 open, the ground normally supplied via contacts A202 and the contacts A128 of pulse check relay A120 to the grid of triode A124 will be discontinued and triode A124 will no longer conduct. Pulse check relay A120 will therefore de-energize, opening contacts A128 thereof so that it may not again be re-energized until a ground signal occurs on start pulse check conductor A76 as previously described.

When end pulse check relay A198 is energized, the contacts A204 thereof are opened to temporarily disconnect the reader pulse error conductor 326 from the attendance recording adaptor 304. When pulse check relay A120 de-energizes, its contacts A130 open so that reader pulse error conductor 326 will not be reconnected to the adaptor when end pulse check relay A198 de-energizes.

In this manner, means are provided which are responsive to the beginning of scanning of the data to be transmitted from a single document reader, which means provide an error signal whenever more than one pulse occurs during transmission of a character on the data lines 46. It will be apparent to those skilled in the art that, if desired, the values of resistors A166, A170–A186, A188 and A190 may be chosen so that more than any predetermined number of pulses on data conductors 46 will produce a pulse error signal on reader pulse error conductor A26.

*Preventing reader lock-up.*—Again referring to FIGURE 4A, when reader transmit relay A42 energizes, normally open contacts A206 thereof close to complete an energization circuit to transmission interval relay A208. This circuit may be traced from a source of minus 48-volts D.C. potential through normally closed contacts A116 of error slave relay A112 through contacts A206 to transmission interval relay A208, and from a ground through armature A108 of reader correct message relay A106 and normally closed relay contacts A210 to the transmission interval relay A208.

When transmission interval relay A208 is energized, contacts A212 thereof close to complete a self-energization circuit in parallel with the circuit including contacts A206. Thus transmission interval relay A208 will remain energized after the reader transmit relay has been de-energized upon operation of the end of scan relay A96. Normally transmission interval relay A208 will be de-energized upon receipt of an error signal on conductor 106 and the opening of contacts A116 of error slave relay A112, or the receipt of a reader correct message signal on conductor 328 which energizes reader correct message relay A106 to disconnect the ground to transmission interval relay A208. If, however, due to some malfunction of the equipment of the data communications system no reader correct message or error signal is received, the transmission interval relay A208 will remain energized.

Armature A214 of transmission interval relay A208 is connected through resistor A216 to the grid of triode A218. The grid of triode A218 is also connected through a capacitor A220 to ground and through resistor A222 and variable resistor A224 to the cathode of triode A218. The plate of triode A218 is connected through resistor A226 to a source of plus 250-volts D.C. potential. The cathode of triode A218 is connected through resistor A228 to ground and through resistor A230 to the grid of a second triode A232. The grid of triode A232 is also connected through resistor A234 to a source of minus 48-volts D.C. potential. The cathode of triode A232 is connected to ground and the plate thereof is connected in series through resistor A236 and lock-up relay A238 to a source of plus 250-volts D.C. potential.

Triode A218 may be one-half of a type 5963 and triode A232 may be one-half of a type 5687. Resistor A216 is then approximately one kilohm, resistor A222 is approximately 100 kilohms, variable resistor A224 has a maximum rating of 2.5 megohms, resistor A230 is approximately 330 kilohms, resistor A234 is approximately 200 kilohms, all plus or minus five percent, rated at one-half watt. Capacitor A220 may be 0.05 microfarad. Resistor A226 is approximately 2.7 kilohms plus or minus five percent, rated at one watt, resistor A220 is approximately ten kilohms plus or minus five percent, rated at two watts, and resistor A236 is approximately 7.5 kilohms, plus or minus five percent, rated at five watts.

Normally triode A232 is not conducting, due to the negative bias applied to its grid through resistor A234. In this case, lock-up indicator relay A238 is not energized. Capacitor A220 is fully charged so that the grid of triode 218 is at ground potential. Triode 218 then conducts slightly and its cathode is at a slightly positive potential. However, this potential is not high enough to overcome the negative bias on the grid of triode A232.

When transmission interval relay 208 opens, disconnecting the ground at armature A214, capacitor A220 discharges through resistors A222, A224 and A228 and the potential at the grid of triode A218 slowly rises. Triode A218 therefore gradually becomes more conducting, slowly raising the potential at the grid of triode A232 until, after a predetermined time depending upon the adjustment of resistor A224, triode A232 conducts thereby energizing lockup indicator relay A238. Relay A238 remains energized so long as the armature of transmission interval relay A208 is not grounded, that is, so long as transmission interval relay A208 is energized. The predetermined time between energization of transmission interval relay A208 and the energization of lock-up indicator relay A238 is chosen to be much longer than the time required for a transmission from a reader 300. This may be, for example, 800 milliseconds.

The energization of relay A238 opens contacts A210 thereof to interrupt the ground circuit to transmission interval relay A208, which therefore de-energizes, and a ground is again supplied to armature A214 thereof. Thus, during a short period of time while capacitor A220 charges, lock-up indicator relay A238 remains energized and then de-energized.

During the short period of time that relay A238 is energized, armature A44 thereof opens the ground circuit to reader transmit relay A42, thus conditoning the attendance recording adaptor for reception of another reader search inhibit signal on conductor 316. Furthermore, the ground at armature A44 of relay A238 is applied to error slave relay A112 which energizes to supply a ground via contacts A114 thereof to reader error conductor 332. This insures restoration of the reader which was in the process of transmitting when the lock-up condition occurred. Energization of error slave relay A112 further opens the minus 48-volt energization circuit via contacts A116 thereof to the transmission interval relay A208 to insure that transmission interval relay A208 remains de-energized while the error signal is being transmitted. Further, since contacts A116 of error slave relay A112 supply the negative 48-volt energization to the reader hold and reader start conductors 320 and 318, no reader can have its transmit relay B90 (FIGURE 3A) energized during transmission of the reader error signal on conductor 332.

Thus there is provided at the attendance recording adaptor 300 means responsive to failure of the central receiver-recorder 22 in providing either an error signal on 106 or a reader correct message signal on conductor 328 during a predetermined period following the reception at the attendance recording adaptor of a transmitter start signal on conductor 94 during reception of a reader search inhibit signal on conductor 316.

*Multiple document data transmitter control.*—For a complete understanding of the conditioning for transmission and initiation of transmission from a multiple document data transmitter 20 (FIGURE 2) by means of the central receiver-recorder 22, reference should be had to the above-identified copending application Serial No. 863,227.

The attendance recording adaptor 304 comprises a transmitter start relay A240, and a transmitter transmitting relay A242 (FIGURE 4A). Whenever a multiple document data transmitter 20 (FIGURE 2) is ready to transmit, it supplies a ground to ready to transmit conductor 86a. This normally is supplied on ready to transmit conductor 86 to the central receiver-recorder 22. When the location relay of a ready to transmit transmitter is energized over the search conductors 76a and 84a, the calling data transmitter grounds search inhibit conductor 92 of the common communication cable 24 to terminate the searching operation and to condition the central receiver-recorder 22 for reception of its message. When the central receiver-recorder 22 is ready to receive a message from the located data transmitter 20, it transmits to it a transmitter start signal on conductor 94 simultaneously with a transmitter hold signal on conductor 98.

Now referring to FIGURE 4A, since it is a multiple document data transmitter 20 whose location relay energized, reader on line relay A10 will not energize since no reader search inhibit signal on conductor 316 will be received at attendance recording adaptor 304. Consequently, reader on line slave relay A14 will be de-energized and the contacts A22 thereof open. Thus, the transmitter start signal on conductor 94 will not energize reader start relay A38. Furthermore, contacts A244 of slave relay A14 will be closed as will be contacts A246 of reader transmit relay A42. The negative 48-volt transmitter start signal on conductor 94 will therefore be supplied to the grid of triode A248. Triode A248, which normally conducts, will therefore be cut off during reception of the transmitter start signal on conductor 94.

The grid of triode A248 is connected to ground through a resistor A250, the cathode thereof is connected to ground, and the plate is connected through resistor A252 to a source of plus 250-volts D.C. potential and through resistor A254 to the grid of triode A256. When triode A248 is conducting, the plate of triode A248 will be near ground potential and the grid of triode A256 will be negatively biased through resistor A258 connected between the grid of triode A256 and a source of minus 150-volts D.C. potential. Triode A256 will therefore be cut off.

However, during reception of the minus 48-volt D.C. transmitter start signal on conductor 94, triode A248 will be cut off and the plate thereof will rise to a positive potential. This will raise the grid of triode A256 to a sufficiently positive potential to cause it to conduct. A resistor A260 and transmitter start relay A240 are connected in series between the plate of triode A256 and a source of plus 250-volts D.C. potential. When triode A256 conducts, transmitter start relay A240 will energize. The normally open contacts A262 thereof will close completing an energization circuit to energize transmitter transmitting relay A242 and contacts A264 and A266 thereof will close.

At this time the located multiple document data transmitter will supply a ground signal on transmitter message gate conductor 102a and closure of contacts A266 of transmitting relay A242 will apply this ground to message gate conductor 102 for transmission to the central receiver-recorder 22. Furthermore, closure of contacts A264 of transmitter transmitting relay A242 will supply this ground to the grid of triode A268 connected in parallel with triode A256 (that is the plate of triode A268 is connected to the plate of triode A256 and the cathodes thereof are connected together and to ground). Triode A268 is normally cut off through the action of a negative bias at its grid supplied by a resistor A270 connected between the grid and a source of minus 48-volts D.C. potential.

When the message gate signal is present on conductor 102 and contacts A264 close, the grid of triode A268 is grounded and it conducts to supply energization to transmitter start relay A240. Therefore, transmitter start relay A240 will remain energized so long as the message gate signal (ground) is present on message gate conductor 102, that is, so long is it is being transmitted from the transmitting multiple document data transmitter 20 on transmitter message gate conductor 102a.

Triode A248 may be one-half of type 5963, triodes A266 and A268 each may be one-half of a type 5687. In that case resistor A250 is approximately 100 kilohms, resistor A254 is approximately 560 kilohms, resistor A258 is approximately one megohm, resistor A270 is approximately 100 kilohms, all plus or minus five percent, rated at one-half watt. Resistor A252 is then approximately 100 kilohms, plus or minus five percent, rated at one-half watt and resistor A260 is approximately five kilohms plus or minus five percent rated at five watts.

Therefore, transmitter start and transmitter transmitting relays A240 and A242 are energized upon reception of a transmitter start signal on conductor 94 when no reader search inhibit signal has been received on reader search inhibit signal conductor 316. Relays A240 and A242 remain energized until termination of a transmitter message gate signal on transmitter message gate conductor 102a.

When transmitter start relay A240 initially energizes, contacts A272 thereof close to connect transmitter character gate conductor 48a to character gate conductor 48 of the common commuication cable 24 for transmission to the central receiver-recorder 22. Whenever characters are being transmitted in the message, a ground on character gate conductor 48 supplies this information to the central receiver-recorder 22.

When transmitter transmitting relay A242 energizes the contacts A274 thereof at the bottom of FIGURE 3A open to prevent a reader start signal from reaching any document reader 300 so that the reader transmit relays B90 (FIGURE 3A) thereof may not become energized during a transmission from a multiple document transmitter.

*Priority mode*

The attendance recording adaptor 304 includes a priority mode switch 312 (FIGURE 1 and FIGURE 4C) and a cam operated switch A276 (FIGURE 4C) connected in parallel with switch 312. When either switch is closed, a priority mode condition is established at the attendance recording adaptor 304.

Referring to FIGURE 4C, the adaptor may include a secondary clock, A278 connected to the clock lines 66 under control of a master clock (not shown) at the central receiver-recorder 22. Clock A278 may be of the type disclosed in United States Patent Number 2,917,591, issued December 15, 1959, to M. Juhas and assigned to the assignee of the present application. A cam A280 driven by clock A278 closes switch A276 at preselected times for predetermined time intervals. These may be, for example, at the beginning and end of each work shift at a plant where the data collection system of the present invention is installed.

Whenever either manual control switch 312 or time control switch A276 is closed, a reader priority relay A282 is connected to contacts A284 of reader on line slave relay A16 (FIGURE 4A). Reader priority relay A282 will then operate whenever relay A16 is energized, thereby indicating that a single document reader 300 has transmitted a reader search inhibit signal on conductor 316 of the common control cable 302 (FIGURE 2). Thus, reader priority relay A282 (FIGURE 4C) will operate for a short period of time just prior to scanning of a single document reader 300 by the attendance recording adaptor 304.

Upon operating, reader priority relay A282 closes contacts A286 thereof to complete a self-energizing ground circuit through armature A288 of relay A290. Reader priority relay A282 then remains energized until operation of the end reader priority relay A290.

The energization of end reader priority relay A290 is controlled by a timing circuit comprising triodes A292 and A294 which is schematically similar to and operates in the same manner as the timing circuit controlling the lock-up indicator relay A238 of FIGURE 4A.

Triode A292 is normally not conducting. The plate of triode A292 is connected to resistor A296 in series with the end reader priority relay A290. The cathode of triode A292 is connected to ground. The grid of triode A292 is connected through resistor A298 to a source of minus 48-volts D.C. potential and through a resistor A300 to the cathode of triode A294. The cathode of triode A294 is connected through resistor A302 to ground and through fixed resistor A304 and variable resistor A306 to the grid of triode A294. The grid of triode A294 is also connected through a capacitor A308 to ground and through resistor A310 and via conductor A314 to three possible sources of ground potential. They are armature 288 of end reader priority relay 290, armature A312 of reader priority relay A282 and armature A316 (FIGURE 4A) of reader on line slave relay A16.

Triode A292 may be one-half of a type 5687 and triode A294 may be one-half of a type 5963. Resistor A296 then is approximately 7.5 kilohms, plus or minus five percent, rated at five watts. Resistor A318 connected between the plate of triode A294 and a source of plus 250-volts D.C. potential then is approximately 2.7 kilohms, plus or minus five percent, rated at one watt. Resistor A302 then is approximately 10 kilohms, plus or minus five percent, rated at two watts. Then resistor A298 is approximately 200 kilohms, resistor A300 is approximately 330 kilohms, resistor A304 is approximatel 100 kilohms, variable resistor A306 may have a maximum resistance of 2.5 megohms, and resistor A310 is approximately one kilohm, all plus or minus five percent, rated at one-half watt. Capacitor A308 is then approximately .25 microfarad.

Since end reader priority relay A290 is normally de-energized, armature A288 thereof does not normally supply a ground to conductor A314. When reader priority relay A282 initially energizes, the ground from armature A312 thereof will be terminated. However, while reader priority slave relay A16 (FIGURE 4A) remains energized, a ground will be supplied to conductor A314 via armature A316. In this case, triode A294 will only be slightly conductive and triode A292 will not conduct. However, when the reader transmit relay A42 energizes and reader on line relay A10 de-energizes, slave relay A16 will be de-energized terminating the ground on conductor A314. Triode A294 then gradually becomes more conductive and the potential at its cathode gradually becomes more positive until, after a predetermined interval (which in the example shown may be varied from zero to four seconds), triode A292 will conduct to energize end reader priority relay A290.

If, however, another reader is located during this predetermined interval, a second reader search inhibit signal will be supplied on reader search inhibit conductor 316 to energize reader on line relay A10 of FIGURE 4A and to thus operate slave relay A16 to reapply a ground to conductor A314. In this case, triode A292 will not conduct and end reader priority relay A290 will not energize.

It will be seen that reader priority relay A282 energizes upon receipt of a reader search inhibit signal at the attendance recorder adaptor 304. It remains energized after the termination of this signal. After the reader search inhibit signal terminates and reader transmit relay A42 energizes upon receipt of a transmitter start signal on transmitter start conductor 94, the timing circuit of triode A294 and A292 begins operating. After a predetermined interval, unless another reader search inhibit signal is received on conductor 316 indicating another reader is ready to be scanned, the end reader priority relay A290 will operate. When end reader priority relay A290 operates, the transfer of armature A288 thereof discontinues the ground circuit via contacts A286 to reader priority relay A282 and its de-energizes to end the reader priority period.

Contacts A320 of reader priority relay A282 are closed when relay A282 is energized. Therefore, when end reader priority relay A290 initially operates, contacts A322 thereof close to complete a ground circuit to the grid of triode A292 so that it remains conducting to keep end reader priority relay A290 energized until reader priority relay A282 has de-energized.

While reader priority relay A282 is energized contacts A2 thereof open to disconnect ready to transmit conductor 86a from the ready to transmit conductor 86 connected to the central receiver-recorder 22. Thus, the search mechanism of the central receiver-recorder 22 cannot be energized while reader priority relay A282 is energized.

When reader priority relay A282 is energized the ground at armature A312 thereof is supplied to conductor A324. The ground on conductor A324 conditions for operation a plurality of search transfer relays A326, A328 and A330. Each of the search transfer relays A326, A328 and A330 are connected to a source of minus 48-volts D.C. potential and to conductor A332. Conductors A324 and A332 are connected to the normally closed contacts A334 of reader on line slave relay A16 of FIGURE 4A. Now contacts A334 will be open when conductor A324 is initially grounded. However, when reader transmit relay A42 operates at the start of scanning of the transmitting single document reader 300, relay A16 will de-energize. Contacts A334 thereof close to supply a ground to search transfer relays A326, A328 and A330 in FIGURE 4C. The search transfer relays then operate and contacts A336 of search transfer relay A330 close connecting conductor A324 to conductor A332 so that the search transfer relays remain energized so long as a ground is supplied to conductor A324 by armature A312; that is, so long as reader priority relay A282 remains energized. When search transfer relay A330 operates, contacts A4 thereof open to disconnect ready to transmit conductor 86a from ready to transmit conductor 86 connected to central receiver-recorder so that the search mechanism of the central receiver-recorder cannot be actuated during energization of the search transfer relays A326, A328 and A330.

Energization of search transfer relay A326 transfers contacts A6 thereof to disconnect search conductors 76a, connected to the readers and transmitters, from the search conductors 76 connected to the central receiver-recorder. Transfer of contacts A6 connects the search conductors 76a to a search stepping mechanism A338 at the attendance recording adaptor 304 and, in particular, connects the search conductors 76a to level A340 of the search stepping mechanism A338. Transfer of contacts A8, upon energization of search transfer relay A328, disconnects search conductors 84a from search conductors 84, connected to the central receiver-recorder, and connects search conductor 84a to terminal board A342.

Preferably, the single document readers 300 used for attendance recording are connected only to certain preselected conductors from search conductors 84a. As shown, these search conductors are connected to conductors A344, A346 and A348. Single document readers 300 and multiple document data transmitters 20 to which it is not desired to give priority during the priority mode are connected to the other conductors of search conductors 84a, i.e., to those connected to conductors A350, A352 and A354. The stepping mechanism A338 includes a second stepping switch level A356 wherein groups of six terminals are connected together and to the terminals of a record terminal board A358. Only conductors A344, A346 and A348, connected to document readers given priority, are connected to level A356 via terminal board A358. Furthermore, each of the conductors A344, A346 and A348 are connected to two groups of six contacts at level A356 so that as wiper A360 of level A356 makes one revolution, it will be alternately connected in circuit conductors A344, A346 and A348 twice on each revolution. During this same time, wiper A362 of stepping switch level A340 which moves in synchronism with wiper A360 will sequentially connect to a source of minus 48-volts D.C. potential each of the search conductors 76a during each period that one of the conductors A344, A346 and A348 are connected to ground by wiper A360. In this manner only those single document readers 300 connected to conductors A344, A346 and A348 may have their location relays energized when search transfer relays A326, A328, A330 are energized, and no system time is lost searching non-priority search conductors A350, A352 and A354.

The search stepping mechanism A338 is similar to that shown in FIGURE 15C of the above-identified copending application Serial No. 863,227, and operates in essentially the same manner. Closure of contacts A364 of search transfer relay 330 supplies minus 48-volts D.C. energization to a search control relay A366. Contacts A368 thereof then close. Normally a priority search inhibit conductor A370 is supplied with minus 48-volts D.C. potential at normally closed contact A372 of reader on line slave relay A14 (FIGURE 4A). Thus, search relay A374 is energized. However, on operating, relay A374 opens its contacts A376 to de-energize search control relay A366. When search relay A374 operates its advances wipers A360 and A362 one contact. When search control relay A366 de-energizes, contacts A368 open the energization circuit of relay A374 and it de-energizes to re-establish the operating circuit of search control relay A366 which is again energized. This re-establishes the energization circuit of search relay A374 which again operates to step wipers A360 and A362 to another contact. This stepping operation proceeds regularly as timed by timing circuit A378 until the priority search inhibit conductor A370 is disconnected at contacts A372 (FIGURE 4A) of slave relay A14 upon receipt of a reader search inhibit signal on reader search inhibit conductor 316, or until the end of reader priority when search transfer relays A326, A328, A330 de-energize.

Thus, apparatus is provided responsive to the manual or automatic establishment of a priority mode. After establishment of this priority mode this means is responsive to a first reader search inhibit signal to establish a reader priority condition during which period only preselected single document readers will be conditioned for transmission so long as the time between subsequent reader search inhibit signals is no greater than a predetermined interval.

*The workman's identification badge*

The single documents 336 read by the single document readers 300 during attendance recording preferably take the form of a workman's identification badge 338 shown in FIGURES 6 and 7. The badge comprises a machine readable portion 340 of a durable material such as plastic or metal having punched therein a plurality of rectangular holes 342. The holes 342 are punched in a plurality of perpendicular rows and columns. Only one hole 342 is punched in each column and the rows in which it is punched indicates the character recorded. Laminated to the upper portion 344 of the punched portion 340 is a transparent sheet 346 preferably of plastic material. A second sheet 348, also preferably of plastic material, is laminated to sheet 346. An identifying photograph 350 may be laminated between sheets 346 and 348.

A clip 351 is attached by means of rivet 352 to sheet 348 so that the identification badge 338 may be conveniently attached to the clothing of the worker. The punched portion 340 may include identifying information 354, such as the employee's number recorded by the punches 342, his name, signature, etc.

One corner 356 of the identification badge 338 is diagonally cut and means are provided at the readers 300 cooperating with the diagonal cut 356 so that the badge may be introduced into the readers in only one orientation.

A locking hole 358 is provided at the bottom of the badge 338. This hole is engaged by a pin of the latching means B46 (FIGURE 3A) of the readers 300 so that the badge 338 may not be withdrawn from the reader until reception of a correct message signal, or if an error has occurred until the workman acknowledges the error by depressing the release switch B50 as described in the description of the single document reader 300.

Thus, the workman's identification badge 338 includes means engageable by a pin in the readers to insure that a workman is made aware of an erroneous transmission, and to positively bring home to him the need for reinserting his identification badge 338 so as to transmit a correct message.

It will thus be seen that the objects set forth above, among those made apparent from the preceding description, are efficiently attained and, since certain changes may be made in practicing the disclosed method of data collection and in the apparatus set forth without departing from the scope of the invention, it is intended that all matter contained in the above description or shown in the accompanying drawings shall be interpreted as illustrative and not in a limiting sense. It is to be understood, for example, that while the preferred embodiment discloses multiconductor communication and control cables as the intercommunicating links between transmitter or reader stations and the central receiver-recorder or the attendance recording adaptor and between the adaptor and the central receiver-recorder, the invention is not so limited but may be employed with other suitable types of communication channels such as, but not limited to, multiple frequency carrier circuits over a common conductor, or radio frequency communication channels which may be either amplitude or frequency modulated. It is further to be understood that while the continuous medium record output disclosed herein is punched tape, the invention is equally applicable to magnetic tape, or to any other form of record media. Wherever thermionic and electro-mechanical switching devices have been disclosed herein it will be understood that equivalent electronic devices, including solid state devices such as transistors, may be substituted without departing from the invention.

It is also to be understood that the following claims are intended to cover all of the generic and specific features of the invention which, as a matter of language, might be said to fall therebetween. Particularly, it is to be understood that in said claims, elements recited in the singular are intended to include compatible combinations of equivalent elements wherever the sense permits.

What is claimed is:

1. In a data collection system, a document reader station comprising, in combination:
   (A) memory means
      (a) settable by means of a document inserted in the reader station to store characters recorded on the inserted document;
   (B) means at said reader station
      (a) for providing a ready to transmit signal when said memory means has been set to store a predetermined number of characters;
   (C) conditioning means
      (a) responsive to a predetermined individual conditioning signal to condition the reader station for transmission;
   (D) transmit means
      (a) controlled by said conditioning means, and
      (b) responsive to a transmit signal when said reader is conditioned for transmission to condition said memory means for transmission over common data communication channels; and,
   (E) scanning signal responsive means
      (a) responsive to scanning signals when said memory means is conditioned for transmission to cause the characters stored in said memory means to be transmitted over the communication channels.

2. The combination defined in claim 1, and:
   (F) error prevention means
      (a) responsive to said memory being preset to store said predetermined number of characters to prevent setting of said memory means by another document; and,
   (G) reset means
      (a) responsive to receipt of a correct message signal to reset said memory means so that it may be set to store characters recorded on another document.

3. The combination defined in claim 2, and:
   (H) error signal responsive means
      (a) responsive to receipt of an error signal to provide an error indication to the operator of the reader station, and;
   (I) manually operable means
      (a) controlling said reset means, and
      (b) upon being manually operated causing said reset means to reset said memory means.

4. The combination defined in claim 3, and:
   (J) means
      (a) responsive to said memory means being set to store fewer than said predetermined number of characters to provide an error indication to the operator of the reader station.

5. The combination defined in claim 1, and:
(F) means under control of said memory means
  (a) responsive to said memory means being set to store less than said predetermined number of characters
    (1) to provide an error indication to the operator of the reader station, and
    (2) to prevent transmission of said ready to transmit signal; and,
(G) manually operable reset means
  (a) conditioned for operation by said last named means for resetting said memory means upon manual operation thereof so that said memory means may again be set by reinsertion of the document into the reader station.
6. The combination defined in claim 5, and:
(H) error signal responsive means
  (a) responsive to an error signal
    (1) to provide an error indication to the operator of the reader station, and
    (2) to condition said manually operable reset means for manual operation.
7. A single document reader for a data collection system comprising, in combination:
(A) memory means comprising
  (a) a plurality of sensors each actuatable by a character recorded on a document inserted into the reader;
  (b) means
    (1) responsive to the initial actuation of all of said sensors and to the full insertion of a document into the reader to provide a ready signal.
    (2) said means being further responsive to full insertion of a document into the reader when all of said sensors have not been initially actuated.
      (i) to provide an error indication, and
      (ii) to reset said memory means upon withdrawal of the actuating document from the reader;
(B) ready to transmit means
  (a) responsive to said ready signal to provide a ready to transmit signal;
(C) location means
  (a) under control of said ready to transmit means and when conditioned thereby
  (b) responsive to a predetermined signal to provide a search inhibit signal;
(D) transmit means
  (a) conditioned by said location means upon reception thereof of said predetermined signal,
  (b) said transmit means when so conditioned responsive to a start signal and to a continuous hold signal
    (1) to connect said memory means to common communication channels for the duration of said hold signal
    (2) controlling said location means so that it is no longer responsive to said predetermined signal, and
    (3) controlling said ready to transmit means to discontinue said ready to transmit signal;
(E) signal responsive means
  (a) responsive to a correct message signal to reset said memory means and,
  (b) responsive to an error signal to provide an error indication to the operator of the reader; and
(F) manually operable means for resetting said memory means after reception of an error signal.
8. The combination defined in claim 7, and:
(G) latch means
  (a) responsive to full insertion of a document into the reader to prevent withdrawal of the document therein, and
  (b) responsive to operation of said manually operable means to allow withdrawal of the document therein.
9. The combination defined in claim 8 wherein said latch means comprises a latching pin for engaging an opening in a document fully inserted in said reader.
10. An adaptor for correction to a plurality of document readers in a data collection system wherein a plurality of data transmitters are connected via common communication channels to a central receiver-recorder, said adaptor comprising, in combination:
(A) reader on line means
  (a) responsive to a reader on line signal on a communication channel indicating that a document reader has been selected for transmission;
(B) start means
  (a) controlled by said on line means and
  (b) responsive to a start signal received from the central receiver-recorder after reception of said reader on line signal; and
(C) transmit means
  (a) responsive to actuation of said start means by said start signal to provide scanning signals for transmission to the selected document reader to cause transmission thereat, and
  (b) said transmit means further provides control signals for transmission to all of said document readers to cause the selected one thereof to be connected to common data communication channels connected to said central receiver-recorder.
(D) transmission error detection means
  (a) monitoring the data communication channels used for transmission from the document readers and
  (b) providing a reader transmission error signal upon the simultaneous occurrence of more than a predetermined number of pulses on the said data communication channels;
(E) priority means
  (a) selectively actuatable to be responsive to the occurrence of each of said reader on line signals to establish a priority condition for a predetermined time interval;
(F) selection means
  (a) connected during said priority condition to select only the document readers for transmission; and,
(G) transfer means
  (a) controlled by said priority means for disconnecting the data transmitters from selection means at said central receiver-recorder during said priority condition whereby only said special reader stations will be selected for transmission during each said interval; and
(H) lock-up indicator means
  (a) responsive to operation of said transmit means to provide an error signal for transmission to said document readers when no correct message signal or error signal has been provided by the central receiver-recorder during a predetermined time interval greater than that normally required for a complete transmission from a document reader.
11. The combination defined in claim 10 wherein each data transmitter of the data collection system provides a message gate signal during transmission of a message therefrom and a character gate signal during transmission of a group of characters therefrom, and wherein said adaptor further comprises, in combination:
(I) transmitter transmitting means
  (a) responsive to reception of a start signal from said central receiver-recorder when no reader on line signal has been received from the document readers to thereupon connect communication channels between the data transmitters and the central receiver-recorder for transmission of said message gate and character gate signals.

12. The combination defined in claim 11, wherein said transmit means further provides a message gate and a character gate signal for transmission to the central receiver-recorder during transmission of said scanning signals.

13. The combination defined in claim 12, wherein said transmit means further provides a reader message gate signal for transmission to the central receiver-recorder during transmission of said scanning signals.

14. The combination defined in claim 13, wherein the receiver-recorder upon discontinuance of said reader message gate signal normally provides a correct message signal or an error signal and said adaptor further comprises:

(J) end of scan responsive means (a) responsive to the termination of generation of said scanning signals by said transmit means to terminate generation of at least one of said control signals;

(K) error signal responsive means (a) responsive to an error signal from the central receiver-recorder or from said lock-up indicator means to terminate at least one of said control signals.

References Cited by the Examiner
UNITED STATES PATENTS 3,014,647    12/1961    Ditmer et al. _____ 235—61.11
3,029,414    4/1962    Schrimpf _____ 340—172.5

ROBERT C. BAILEY, *Primary Examiner.*

G. D. SHAW, *Assistant Examiner.*